(12) United States Patent
Sorg

(10) Patent No.: US 11,764,555 B2
(45) Date of Patent: Sep. 19, 2023

(54) DEVICE FOR WORKING AN ELECTRICAL CABLE

(71) Applicant: METZNER HOLDING GMBH, Ulm (DE)

(72) Inventor: Manfred Sorg, Ulm (DE)

(73) Assignee: Metzner Holding GmbH, Ulm (DE)

( * ) Notice: Subject to any disclaimer, the term of this patent is extended or adjusted under 35 U.S.C. 154(b) by 47 days.

(21) Appl. No.: 17/430,268

(22) PCT Filed: Feb. 12, 2020

(86) PCT No.: PCT/EP2020/053533
§ 371 (c)(1),
(2) Date: Aug. 11, 2021

(87) PCT Pub. No.: WO2020/165206
PCT Pub. Date: Aug. 20, 2020

(65) Prior Publication Data
US 2022/0140581 A1 May 5, 2022

(30) Foreign Application Priority Data
Feb. 12, 2019 (DE) .......................... 102019103487.6

(51) Int. Cl.
*H02G 1/12* (2006.01)
*H01R 43/28* (2006.01)

(52) U.S. Cl.
CPC ........... *H02G 1/1297* (2013.01); *H01R 43/28* (2013.01); *H02G 1/1256* (2013.01);
(Continued)

(58) Field of Classification Search
CPC .. H02G 1/1297; H02G 1/1273; H02G 1/1275; H02G 1/1285; H02G 1/128;
(Continued)

(56) References Cited

U.S. PATENT DOCUMENTS 1,477,678 A 12/1923 Wetmore
1,784,298 A 12/1930 Mahan
(Continued)

FOREIGN PATENT DOCUMENTS

CH 710236 A2 4/2016
CN 103887740 A 6/2014
(Continued)

OTHER PUBLICATIONS

Chinese Office Action issued in App. No. CN202080024504.0, dated Feb. 27, 2023, 10 pages.
(Continued)

*Primary Examiner* — Thiem D Phan
(74) *Attorney, Agent, or Firm* — Koffsky Schwalb LLC

(57) ABSTRACT

The invention relates to a device (21) for working an electrical cable (1) which has a sheath (6) and a cable film (5) situated beneath said sheath, comprising an assembly (32) of modules (33, MD1, MD2, MD3, MD4), which are independent of one another, for removing a piece (6') of sheath and a piece (5') of cable film from the cable (1). According to the invention, provision is made for the assembly (32) to have a first module (MD1) for cutting off the piece (6') of sheath from the cable (1), a second module (MD2), which follows the first module (MD1), for reducing the mechanical loadability of the cable (5) in an intended crack position (RP), and a third module (MD3), which follows the second module (MD2) and has the purpose of removing the piece (6') of sheath and the piece (5') of cable film from the cable (1) in an automated manner.

18 Claims, 6 Drawing Sheets

(52) U.S. Cl.
CPC ......... *H02G 1/1273* (2013.01); *H02G 1/1275* (2013.01); *Y10T 29/53213* (2015.01)

(58) Field of Classification Search
CPC .... H02G 1/1282; H02G 1/1287; H02G 1/129; H02G 1/1265; H02G 15/184; Y10T 29/53213
USPC ......... 29/748, 747, 751, 753, 787, 857, 861, 29/863, 865, 867
See application file for complete search history.

(56) References Cited

U.S. PATENT DOCUMENTS

| | | | |
|---|---|---|---|
| 5,072,632 | A | 12/1991 | Sayyadi |
| 6,740,816 | B2 | 5/2004 | Treutlein |
| 9,520,700 | B2 | 12/2016 | Stepan |
| 9,906,005 | B2 | 2/2018 | Baldauf |
| 9,954,346 | B2 * | 4/2018 | Meierhans ........... H02G 1/1248 |
| 10,056,743 | B2 | 8/2018 | Dober |
| 10,784,663 | B2 | 9/2020 | Messina |
| 2015/0128399 | A1 | 5/2015 | Meierhans |
| 2015/0357094 | A1 | 12/2015 | Ishigure |
| 2016/0180984 | A1 | 6/2016 | Cai |
| 2018/0175595 | A1 | 6/2018 | Ben-Ron |

FOREIGN PATENT DOCUMENTS

| | | | |
|---|---|---|---|
| CN | 104769796 A | 7/2015 | |
| CN | 106253027 A | 12/2016 | |
| CN | 108155605 A | 6/2018 | |
| DE | 3842754 A1 | 7/1989 | |
| DE | 4327356 A1 | 2/1995 | |
| DE | 10026714 A1 | 12/2001 | |
| DE | 102004047384 B3 | 1/2006 | |
| DE | 102015106129 A1 | 6/2016 | |
| DE | 102017118445 | * 8/2017 | ............ H02G 1/128 |
| EP | 2117089 A1 | 11/2009 | |
| EP | 2871736 A1 | 5/2015 | |
| EP | 3089294 A1 | 11/2016 | |
| EP | 3322054 A1 | 5/2018 | |
| JP | 06022425 | 1/1994 | |
| WO | 2007104402 A1 | 9/2007 | |
| WO | 2015125129 A1 | 8/2015 | |
| WO | 2018198877 A1 | 11/2018 | |

OTHER PUBLICATIONS

European Patent Office Communication pursuant to Article 94(3) EPC issued in App. No EP20705052, dated May 4, 2023, 6 pages.
European Patent Office Communication pursuant to Article 94(3) EPC issued in App. No EP20705054, dated Apr. 28, 2023, 7 pages.

* cited by examiner

DEVICE FOR WORKING AN ELECTRICAL CABLE

The invention relates to a device for processing an electrical cable having a sheath and, lying therebelow, a cable film.

The invention moreover relates to a method for processing an electrical cable having a sheath and, lying therebelow, a cable film.

The invention furthermore relates to a computer software product having program code means for carrying out a method for processing an electrical cable. The invention moreover relates to a system for assembling electrical cables and to an electrical cable.

The invention also relates to the use of a functional group of mutually independent modules.

In electrical cables, cable films are at times used for electromagnetic shielding, as a mechanical protection and/or as a protection against moisture for further components of the cable, for example for the protection of electrical conductors, braided cable shields, isolators or dielectrics, respectively. For example, in the case of electrical cables it is important for an insulation layer which isolates the electrical conductor to be protected in relation to moisture. Moisture in the form of vapor can already damage the installation. Furthermore, a cable film can be provided as a barrier layer between a braided cable shield and the (external) cable sheath, as a result of which the cable sheath is able to be more easily stripped in a stripping process, or able to be stripped in the first place, because the cable sheath when stripping can otherwise mechanically catch or jam, respectively, in a braided cable shield situated therebelow.

Depending on the use, the cable films may also be referred to as "shielding films", "insulating films" or "protective films". The term "cable films" chosen here is intended to cover all fields of application.

Cable films of this type can be composed of a single base material, for example of a layer of an insulating material, for example a plastics material, or of a layer of an electrically conductive material, for example a metal. However, composite films which are composed of at least two layers, in particular of at least two layers of different base materials, are also often used. For background information, reference is made in an exemplary manner to DE 10 2015 106 129 A1 which describes a single-sided hot-melt aluminum-plastic composite film and the production method thereof. Reference is made moreover to DE 100 26 714 A1 which describes a halogen-free composite film, a method for the production thereof, and the use thereof for producing flexible flat ribbon cables.

When an electrical cable having a cable film is assembled in an automated manner and in this process is to be at least partially stripped, it is often necessary for the cable film to be removed at the corresponding locations during the stripping process. Because tear-resistant or mechanically robust films are often used, this is typically complex and possible in the first place only by manual labor. The procedure of removing the cable film is time-consuming and prevents fully automated assembling of the cable. In order for the stripping, or the removal, respectively, of the cable film to be simplified, it is proposed in WO 2007/104402 A1 that the cable, or the cable film, respectively, is already produced such that the cable film can subsequently be more easily removed. The film here is produced with a number of mutually spaced-apart embossings which consequently cause weakening of the film material. Manual stripping can be facilitated as a result. However, it is disadvantageous that the cable film in this instance is mechanically weakened in the region of the entire cable, thus also in the region of the cable where the cable film is not to be removed. The intentional weakening of the film material can thus be counter-productive. Furthermore, the production process of the cable film is significantly more complex because the embossings have also to be incorporated in such a manner that said embossings ideally do not penetrate the film because the previously mentioned protection against moisture has to be guaranteed in most instances.

One issue which arises in particular hen removing the film in an automated manner is is that the film is naturally very thin in comparison to the remaining components of the cable. When attempting to cut through the cable film, it can therefore be avoided only with difficulty in practice that components of the cable lying therebelow are at least superficially scored or scratched, respectively, and thus damaged. A particular issue when cutting into the cable film here is that the cable for reasons of tolerances, or in practice, respectively, often does not have a uniformly circular cross section and the depth of the cut may accordingly vary. Damage to an insulation layer by an unintentionally excessively deep cut can compromise the dielectric strength and mechanical robustness or resistance, respectively, of the insulation layer. In an analogous manner, the conductivity and mechanical robustness, in particular the fragility, of electrical conductors can be diminished in the case of damage. A customary braided cable shield of copper coated with tin, for example, can be particularly susceptible to this. As a result, the damaged braided cable shield can break when the cable is stressed at the damaged locations, as a result of which the ground wire and the electromagnetic tightness of the cable may be at risk.

In order to avoid the issue of damage to components of the cable below the cable film when cutting the cable film, a special cable is disclosed in DE 10 2004 047 384 B3, in which cable a filler layer is provided below the cable film, wherein the blade of the knife when cutting through the film damages only the filler layer, the latter being a "sacrificial material", so to speak. A cable constructed in this manner can subsequently be prepared for assembly using simple stripping tools. A correspondingly equipped cable is however complex in terms of production and thus expensive, and has an increased weight and an enlarged circumference, as a result of which said cable appears to be overall impractical in practical use.

A suitable solution for removing the cable film in the course of an automated process cannot be derived from the entire prior art known to date. While the generic EP 3 089 294 A1 does disclose a cable processing installation and a method for removing a shielding film from a shielded multicore round cable, the shielding film in this installation is however again cut using a knife. It is attempted here to cut in such a way that no damage is caused to the insulation or cable cores lying therebelow. In order for this principle to be possible in the first place without causing damage, special cable types and specially shaped knives are required. In practice, it can furthermore not be precluded that a cable processing device of this type nevertheless causes damage to the components of the cable below the cable film, in particular when the cable does not have a completely uniform circular cross section, said cable cannot be precisely guided, and the knives cannot symmetrically slide across the cable sheath at a consistent spacing from the cable central axis. The slightest irregularities in terms of thickness as well as tolerances can lead to damage when the knife for reasons of tolerances at some locations of the cable invades the latter to a greater extent than envisaged.

A further issue when removing in an automated manner a cable film results when axially stripping the cable film encircling the cable. The automated removal of the cable film is not readily possible
in particular in the case of cables having a large diameter, or when the piece of the cable film to be removed is comparatively long. Therefore, the cable film typically has to be manually disentangled or stripped.

In view of the known prior art, the object of the present invention lies in providing a device and a method for processing an electric cable, as a result of which a cable film or a piece of the cable film can be removed from a cable portion to be processed in a manner which is simple, reliable in terms of the process, and free of damage to the cable.

It is moreover an object of the invention to provide a system for assembling electrical cables, and a computer program product for carrying out the mentioned method for processing electrical cables.

It is furthermore an object of the invention to provide an electrical cable, in particular for assembly with an electrical plug connector.

It is finally also an object of the invention to provide an advantageous use of a functional group of mutually independent modules for removing a piece of the sheath and a piece of the cable film from an electrical cable.

Provided according to the invention is a device for processing an electrical cable having a sheath and, lying therebelow, a cable film. The device comprises a functional group of mutually independent modules for removing a piece of the sheath and a piece of the cable film from the cable.

The region of the electrical cable in which the processing predominantly takes place is hereunder at times also referred to as "cable portion to be processed". The cable portion to be processed is a cable end piece or a cable window (a portion of the cable between the end pieces that is relieved from the cable sheath).

The cable portion to be processed is preferably at least partially stripped for electrically and/or mechanically connecting, or contacting, a plug connector, an electrical apparatus and/or for electrically and/or a mechanically fastening to a component (for example an apparatus housing or a body part of a vehicle) that is independent of the cable. It can be provided, for example, that the cable portion to be processed is electrically and/or mechanically connected to a plug connector, a further cable and/or a ground terminal.

Depending on the construction of the electrical cable, it may be necessary for the cable film, or a piece of the cable film, respectively, to be removed in a corresponding operating step in order for the structures which lie even deeper inside the cable to be reached. The present invention proceeds from this point.

The electrical cable can be an arbitrary electrical cable having one or a plurality of inner conductors and/or having one or a plurality of outer conductors. The invention is suitable in a particularly advantageous manner for removing the cable film, or the piece of the cable film, respectively, from electrical cables having a large cross section for a transmission of high currents, for example in the automotive sector, particularly preferably in the sector of electric mobility.

The electrical cable in the state placed in the device can optionally, but not mandatorily, be considered to be part of the device.

The sheath of the cable is preferably the external sheath, or the cable sheath, respectively, of the cable. Accordingly, the piece of the sheath of the cable is preferably a piece of the external sheath, or a piece of the cable sheath of the cable, respectively.

In principle however, this sheath, or the piece of the sheath, respectively, can be an arbitrary component of the cable which radially encases or surrounds, respectively, the cable film, or the piece of the cable film, respectively. For example, this can be an arbitrary electrically isolating sheath, or an arbitrary isolating piece of the sheath, respectively. However, this can also be an electrical conductor, for example an electric shield. For reasons of simplification, the invention hereunder will be described by means of a sheath configured as a cable sheath, or by means of a piece of the sheath configured as a piece of the cable sheath, respectively. This is however not to be understood to be limiting.

The electrical cable can have an outer conductor. The outer conductor can preferably be configured as a braided cable shield (also known under the term "braided shield") which has a plurality of interlaced individual wires. The individual wires of the braided cable shield can be configured as tin-plated copper wires, for example. The outer conductor can preferably run directly below the cable sheath; however, the outer conductor can also form a cable component lying further inside and also run directly below the cable film, for example.

For example, the invention can be advantageously used for use with a single-core coaxial cable for the transmission of electric power, said coaxial cable having in particular a construction composed of a cable sheath lying on the outside, followed by a cable film, followed by a braided cable shield, followed by a dielectric, or an isolator, respectively, and finally followed by an inner conductor. In the course of assembling a cable of this type, a ring-shaped ground terminal of a plug connector is often first connected to the braided cable shield, wherein the braided cable shield, or the outer conductor, respectively, after being exposed is inverted toward the rear, as a result of which a reliable tensile stress relief can be simultaneously provided. Prior thereto, the cable film, or the piece of the cable film, respectively, first has to be removed in the corresponding cable portion in the course of exposing the braided cable shield.

However, the invention is also particularly advantageously suitable for removing the cable film, or the end piece of the cable film, respectively, of electrical cables having a small cross section for the transmission of data, for example in the automotive sector, particularly preferably in the sector of electric mobility.

The electrical cable can have exactly one inner conductor or a plurality of inner conductors, for example exactly two inner conductors or more inner conductors, exactly three inner conductors or more inner conductors, exactly four inner conductors or more inner conductors, exactly five inner conductors or more inner conductors, exactly six inner conductors or more inner conductors, exactly seven inner conductors or more inner conductors, exactly eight inner conductors or even more inner conductors. The invention can particularly advantageously be suitable for the use of a cable having a number of inner conductors requiring an oval cable cross section, such as exactly two inner conductors, for example. An inner conductor can be configured as an individual wire or as a strand having a plurality of individual wires. The individual wire, or the individual wires, of the inner conductor can be configured from a metal wire, for example from a tin-plated copper wire. The inner conductor, or the inner conductors, respectively, (conjointly with the installation described hereunder) can preferably run below the cable film.

The inner conductors can have a respective insulation or a common installation which encases and electrically isolates the inner conductors. The insulation can be configured from a plastics material, for example from foamed polypropylene.

A plurality of inner conductors (conjointly with the respective insulations thereof) can run so as to be guided in parallel in the cable, or can run through the cable so as to be twisted or stranded, respectively. It can in particular be provided that two inner conductors form in each case one differential pair of inner conductors, said inner conductors running through the cable by way of a defined lay (measure of twist).

As has been mentioned above, the cable film, or the piece of the cable film to be removed, respectively, at any arbitrary location within the cable can however be situated relative to one or a plurality of inner conductors, a potentially present electric isolator, a potentially present braided cable shield and the cable sheath.

For example, the invention can also be suitable for processing a cable portion of a cable, the construction of the latter being in particular composed of a cable sheath lying on the outside, followed by a braided cable shield, followed by the cable film, and finally followed by further components, for example an isolator and one or a plurality of inner conductors. The cable film in this case can be partially exposed in that the cable sheath and, lying therebelow, the braided cable shield are at least partially stripped or removed, respectively. It can also be provided that the cable sheath is removed and the braided cable shield is only corrected or folded to the rear, wherein the braided cable shield is folded without further processing, or else can be additionally cut to length and/or disentangled. Ultimately, it is only the accessibility of the cable film for the further processing according to the invention that has to be ensured.

The cable film of the electrical cable can be composed of a single material, in particular of a plastics material (for example, polyethylene terephthalate PET), of a metal (for example, aluminum or copper) or of a textile (for example, polyester). However, the cable film is preferably configured as a composite film and comprises at least two individual layers of dissimilar materials. The cable film can have, for example, exactly two individual layers or more individual layers, exactly three individual layers or more individual layers, exactly four individual layers or more individual layers, exactly five individual layers or even more individual layers. The composition of the individual layers can be arbitrary. For example, a composite film can be provided by a plastics material layer (for example, a PET layer) which on both sides is in each case bordered by a metal layer (for example, an aluminum layer).

It is provided according to the invention that the functional group has a first module for severing the piece of this sheath from the cable, a second module, downstream of the first module, for reducing the mechanical load-bearing capability of the cable film at an envisaged tearing position, and a third module, downstream of the second module, for removing in an automated manner the piece of the sheath and the piece of the cable film from the cable.

The distribution according to the invention of the processing steps among the plurality of mutually independent modules enables the device to be operated as a "production line process", or as a "cycled robot" having successive individual steps so as to reduce the processing time in volume processing.

The device can furthermore be of a modular construction, as a result of which individual modules of the functional group can be replaced, modified or removed without great complexity. As a result, the device can in particular be able to be configured with simple means for processing different types of cables.

In the context of the processing by the first module, the sheath can preferably be scored in a completely ring-shaped encircling manner so as to sever the piece of the sheath. It can however also be provided for this sheath to be scored in a partially ring-shaped encircling manner or in portions in a ring-shaped encircling manner and to initially leave some individual connecting webs, for example.

It can be provided that the cable film in the cable portion to be processed is at least partially exposed before the cable film is processed by the second module. The cable film is preferably exposed in such a manner that said cable film is accessible at least in the region in which the cable film is to be severed.

The envisaged tearing position is preferably a region which has a minor axial extent and encircles the circumference of the cable film in a ring-shaped manner, the cable film in the later course of the processing being intended to tear in an ideally controlled manner in said region, in order for the piece of the cable film to be severed. To the extent that controlled tearing is however not possible or not mandatory, the tearing position can also extend across a longer portion in the axial direction, for example also cross the entire piece of the cable film that is to be removed later. A plurality of tearing positions can also be provided.

In a refinement of the invention it can be provided that the first module, upon severing the piece of the sheath, is configured for carrying out partial stripping of the piece of the sheath from the cable.

The piece of the sheath can be at least partially stripped from the cable film in an axial direction along the central axis of the cable.

For example, a cable sheath (or any other sheath, for example an arbitrary isolator or an outer conductor/braided cable shield) which is scored in a known manner, for example by a knife, does not initially have to be completely removed from the cable before the cable film is processed by the second module.

The severed cable sheath (or the other sheath), which is also referred to as the piece of the cable sheath or the stripped piece (or generally as the piece of this sheath) can remain on the cable; the severed cable sheath is however preferably displaced by a small distance in the direction toward the proximal cable and so as to expose a small part of the cable film, or of the piece of the cable film, respectively, preferably so as to expose at least the envisaged tearing position of the cable film.

In a refinement of the invention it can moreover be provided that the functional group, upstream of the first module, has a mounting module for mounting on the cable at least one plug connector part.

The plug connector part can be, for example, a seal ring or a ferrule or a sleeve, respectively.

The plug connector part by the mounting module, proceeding from the free end of the cable, can be pushed in the axial direction along the cable central axis onto the cable, preferably so far that said plug connector part does not impede the subsequent processing of the cable portion by the further modules of the functional group.

In a refinement of the invention it can furthermore be provided that the functional group has a fourth module, downstream of the third module, for attaching a support sleeve to the cable.

The support sleeve can in particular be a component of a plug connector which in the context of assembling the cable is to be mounted on the cable end to be processed, or on the cable, respectively, in order to contact an outer conductor of the cable and optionally provide a tensile stress relief.

The support sleeve by the fourth module, proceeding from the free end of the cable, can be pushed in the axial direction along the cable central axis onto the cable. For example, the support sleeve is pushed over an outer conductor, in particular a braided cable shield of the cable, and connected to the latter by crimping. It can also be provided that the support sleeve is pushed onto a dielectric, or an isolator, respectively, of the cable, and an outer conductor of the cable, in particular a braided cable shield, is folded back onto the support sleeve and subsequently fixed on said support sleeve or between the support sleeve and a further sleeve.

According to an advantageous refinement of the invention it can be provided that a transport installation of the device successively feeds the cable portion of the cable to be processed to the modules of the functional group.

The transport installation can in particular be configured in the manner of a production line and transport at least one cable from one module to the next module. However, the transport installation preferably transports in each case a plurality of cables from one module to the next module so as to feed a respective cable for processing the latter simultaneously to a plurality of modules such that ideally all modules are always busy in order to achieve a high throughput.

The transport installation can have one or a plurality of gripping installations so as to transport one or a plurality of cables in a defined manner along a first spatial direction between the modules, and optionally to feed said cable/cables along a second spatial direction to the modules.

In a refinement of the invention it can be provided that the second module has at least one circular knife, at least one heating wire, at least one molding tool, at least one refrigerated supply installation, at least one stripping aid, at least one suctioning installation and/order at least one supply installation for chemicals so as to treat at least one external layer of the cable film, spaced apart from the cable central axis, in order for the mechanical load-bearing capability of said external layer to be reduced.

The external layer can be one or a plurality of outer material layers of a composite film. However, the external layer can also be a region of an individual material layer of a composite film that in radial terms lies on the outside, or of a cable film having only a single material layer.

A predetermined breaking point can preferably be incorporated in the cable film by scoring. The predetermined breaking point can be incorporated by a material constriction (notch, perforation and/or scratch). As a result of the predetermined breaking point, the cable film can later break or tear, respectively, in the predictable manner under a corresponding load. The cable film at the tearing position can be weakened in a defined manner by the predetermined breaking point or the notch effect, respectively.

The cable film is preferably treated with the mentioned circular knife. Whereas the scoring of a cable film using a straight knife or using a molding knife by virtue of the minor thickness of the cable film and of the tolerance-related cross-sectional geometry of the cable in practice can often lead to intolerable damage to cable components running below the cable film, it has been surprisingly demonstrated that the scoring of the cable film when using a circular knife can be controlled with high precision as a result of which undesirable damage to cable components can be avoided.

The cable film can preferably not be fully cut through by the circular knife but only scored. In principle however, the cable film may however also be fully cut through, but this is not preferable. Even when the score can optionally (partially or fully) extend beyond the external layer and through an underlying layer of the cable film, or even completely through the cable film, it can for reasons of application be advantageous to only treat the external layer of the cable film because the protective effect of the cable film can in this instance be used for protecting the components of the cable situated below the cable film during searing.

In an advantageous design embodiment of the invention it can be provided that the circular knife, in the absence of a drive, is mounted so as to be rotatable about a rotation axis in such a manner that the circular knife during cutting rolls on the cable film along the circumference of the cable.

As a result of the circular knife being able to roll on the cable film, the necessary cutting pressure which is introduced into the cable film by way of the circular knife during cutting can be reduced and moreover be adjustable in a highly precise manner.

Instead of a circular knife for scoring the cable film, any further cutting installation can be provided, for example one or more molding knives.

According to a design embodiment of the invention it can be provided that the circular knife or any other cutting installation has a cutting depth control and/or a cutting depth limitation. At least one cutting depth limitation can preferably be provided. The cutting depth control and/or the cutting depth limitation can preferably be configured for limiting the cutting depth as a function of the cross-sectional geometry of a cable component, for example of the cable sheath, that directly encases the cable film. A cutting depth limitation can be implemented, for example, by guiding the circular knife, or the cutting installation, respectively, along a gate or along the cable sheath.

According to a design embodiment of the invention it can be provided that the circular knife or any other cutting installation has a cutting pressure control and/or a cutting pressure limitation for the cutting pressure applied to the cable film by the circular knife, or by the cutting installation, respectively. At least one cutting pressure limitation can preferably be provided. The cutting pressure can be predefined and/or limited, for example, while using a linear actuator or an elastic element, in particular a spring (for example a compression spring or a tension spring).

In a design embodiment of the invention it can be provided that the device, in particular the second module, has a guide bush having a through bore for guiding through the cable. The cable can in particular be able to be guided through the through bore of the guide bush, or be guided through the latter, respectively, by way of the front end of the cable. The guide bush is able to stabilize the cable during scoring. The guide bush can moreover be configured for axially and/or radially fixing the cable. The cable is preferably received in the guide bush so as to be secured against rotation relative to the guide bush.

In an advantageous design embodiment of the invention it can be provided that the guide bush on an end facing the circular knife or any other cutting installation has an end face. The end face can have a window for guiding through the cable (or the front cable end, respectively). The window can optionally have a geometry that is adapted to the cable (or to the already pre-processed front cable and which is, for example, relieved from the cable sheath and the outer conductor). Cutting can preferably take place along the end face, or along the bush edge of the guide bush, respectively. As a result of the guide bush on the end side having a window for guiding through the cable (or the front end of the latter, respectively), in particular when the window is adapted to the external geometry of the cable, the cable can advantageously be secured against rotation, for example when the cable has an oval geometry, or any other non-round geometry, respectively. The orientation of the cable within the guide bush can be known, this being advantageous with a view to uniform scoring of the cable film. Optionally, the circular knife can be guided about the guide bush along the external radius of the guide bush so as to provide a cutting depth limitation.

According to a refinement, the third module moreover has means for twisting and/or bending the cable in the region of the piece of the cable film to be removed.

Once a tear has already been at least partially incorporated in the cable film and/or along the cable film by means of the second module, this tear can be extended by twisting and/or bending the cable. If no tear has been previously incorporated but the cable film has been merely mechanically (invisibly) weakened, the tear can also be created in the first place by twisting and/or bending the cable.

The inventor has recognized that a mechanical stress based on torsioning and/or bending can in particular lead to the desired result.

In a refinement of the invention it can be provided that the third module has at least one holding installation for holding the piece of the sheath at a first holding position along the cable central axis, and wherein the third module has a fixing installation for holding the sheath of the cable at a first fixing position, wherein the holding installation and the fixing installation are configured in such a manner that said installations can be mutually converged so as to directly or indirectly compress the piece of the cable film.

In this way, the portion of the cable film, or the piece of the cable film, respectively, that runs between the first holding position and the first fixing position can be directly or indirectly compressed.

The first holding position or fixing position and further holding and fixing positions yet to be described hereunder relate in each case to an axial position along the cable or the sheath, respectively, and can thus be conjointly displaced with the cable, or with the sheath, respectively, in relation to a surrounding absolute coordinate system.

The relative movement of the holding position toward the fixing position can take place, for example, across an axial length of up to 20 mm, preferably across an axial length of up to 10 mm, particularly preferably across an axial length of up to 8 mm, and most particularly preferably across an axial length of up to 5 mm. The relative movement of the holding position toward the fixing position can take place, for example, across an axial length of at least 0.5 mm, preferably across an axial length of at least 1 mm, particularly preferably across an axial length of at least 3 mm, and most particularly preferably across an axial length of at least 5 mm.

A relative movement of the holding position toward the fixing position across a length of 5 mm can typically be advantageous.

In a refinement it can be provided that the fixing installation for compressing the cable film is able to be actuated along an actuating direction for the cable toward the holding installation. The holding position in this case can be immovably held by the holding installation.

An actuation of this type can be particularly advantageous when the first fixing position is situated on the non-severed portion of the sheath or on the portion of the cable that is not to be processed. The fixing position can be, for example, an axial position on the cable at which an actuation installation holds the cable and displaces the latter in or counter to an actuating direction in the context of processing the cable. An already existing actuation installation and an already existing fixing position can thus be advantageously used again for compressing the cable film.

A mutually converging movement of the holding position and the fixing position can however also be understood to be a movement of the holding position in the direction toward the fixing position, wherein the fixing position is immovably held. It can also be provided that the holding position as well as the fixing position are moved.

However, the cable film does not have to be mounted totally compressed for removal. It can also be provided that the cable film in the context of the processing by the third module is exclusively bent or twisted in order for the cable film to break at the envisaged tearing position.

In an advantageous design embodiment of the invention it can be provided that the third module has a gripping tool which, adjacent to the tearing position, is specified for gripping the end piece of the cable film that is to be severed. The gripping tool is preferably specified for gripping exclusively the end piece of the cable film. The gripping tool is particularly preferably specified for gripping the end piece of the cable film in the region of a front end portion.

In a design embodiment of the invention it can be provided that the gripping tool has two gripping jaws which can be actuated in the direction toward the cable central axis. In principle, more than two gripping jaws, for example three gripping jaws or more gripping jaws, or four gripping jaws or even more gripping jaws, can also be provided. The gripping jaws can be actuated in a linear movement toward the cable central axis. However, the gripping jaws can also be actuatable in a curved movement toward the cable central axis. The gripping jaws can be disposed on respective clamping legs. The is clamping legs can optionally be mounted in a common pivot point.

According to a design embodiment of the invention it can be provided that the third module has an actuator installation which is specified for twisting and/or a bending the cable conjointly with the cable film in such a manner that the end piece of the cable film is severed at the tearing position. The actuator installation can have, for example, one, two, three, four or more tappets which are actuatable toward the cable in order for the cable to be bent conjointly with the cable film. The actuator installation can also have, for example, at least one eccentric in order for the cable to be bent conjointly with the cable film.

The actuator installation can be specified for bending the cable conjointly with the cable film along at least one degree of freedom, preferably along at least two degrees of freedom.

In an advantageous design embodiment of the invention it can be provided that the actuator installation is specified for tilting the gripping tool along at least one decree of rotational freedom (relative to the cable central axis), while the gripping tool fixes the cable or the cable film or the end piece of the cable film respectively. A mechanical stress of the cable film at the tearing position can be particularly advantageously introduced into the cable or into the cable film/the end piece of the cable film by way of the gripping tool. The actuator installation can thus be advantageously coupled to the gripping tool, for example to the gripping jaws or the clamping legs. Moreover, the closed gripping tool can even increase the mechanical stress on the cable film initiated by the twisting and/or bending, because a compensation of the length of the path of the cable film that varies as a result of the twisting/bending is prevented, as a result of which the tearing of the cable film can take place in a complete and reliable manner already at minor deflections.

The invention also relates to a system for assembling electrical cables, comprising a device for cutting to length the electrical cable; an installation for opening, erecting and/or inverting a braided cable shield; and/or an installation for attaching and contacting a plug connector part; and a device for processing an electrical cable, preferably a device according to the embodiments above and below.

A fully automated assembly system of this type, while using a device for processing an electrical cable using the mentioned modules, can according to the invention be possible without damage to the components of the cable that are situated below the cable film. Previously it was necessary for the cable film within a system of this type to be manually removed, i.e. by hand, in a laborious manner.

In terms of the system for assembling electrical cables, it is expedient for the corresponding installations to be disposed in successive individual steps as a "production line process" or as a "cycled robot" respectively, in order for the processing time to be reduced in volume production.

The invention moreover relates to a method for processing an electrical cable having a sheath and, lying therebelow, a cable film, in which method a functional group of mutually independent modules is used for removing a piece of the sheath and a piece of the cable film from the cable. It is provided here that a first module of the functional group severs the piece of the sheath from the cable, whereupon a second module of the functional group reduces the mechanical load-bearing capability of the cable film at an envisaged tearing position, and whereupon a third module of the functional group removes in an automated manner the piece of the sheath and the piece of the cable film from the cable.

The processing of the cable can according to the invention be advantageously divided among individual method steps which are carried out by the respective modules of the functional group.

In a refinement of the invention it can be provided that the second module subjects at least one external layer of the cable film that faces away from the cable central axis, at least in the region of the envisaged tearing position, to a thermal treatment, a chemical treatment, an abrasive treatment and/or suctioning procedure and/or scores the cable film and/or adhesively bonds a stripping aid to the cable film and strips said stripping aid from the cable film.

As a result of the cable film being treated only for removing the cable film, or for facilitating said removal, the cable film in the non-treated portions of the cable can continue to provide the complete protective (electromagnetic, mechanical and/or sealing) effect of said cable film to the full extent. The cable film in terms of the mechanical load-bearing capability thereof thus does not have to be manipulated already during the production of the cable, this furthermore simplifying the production of the cable.

In principle, it can be provided for the cable film to be pre-treated with a knife. However, in the previously described processing, the cable film is not cut (in the context of the invention, the cable film can however also be cut). No damage to components of the cable that are situated below the cable film can thus take place, in particular when only the external layer is treated. To the extent that a knife is used for cutting the cable film, a circular knife can however be particularly suitable because a circular knife can particularly readily roll on the circumference of the cable, or of the cable film, respectively.

A braided cable shield is often constructed from shielding strands composed of tin-plated copper, for example. The tin layer ("skin") situated on the copper here typically must not be damaged because as a result thereof, the mechanical load-bearing capability of the cable can be compromised by virtue of the brittleness of the pure copper. A cable film is often wrapped in a protective manner about a braided cable shield of this type, wherein the invention can be particularly advantageously used for removing a cable film of this type because damage to the braided cable shield lying therebelow can be precluded.

At times, the cable film to be removed is however disposed below a braided cable shield and on a further component of the cable, in particular a dielectric, or an isolator, respectively. The invention is also able to be advantageously used in the case of a cable construction of this type because damage to the dielectric, or to the isolator, respectively, can be precluded in this instance. Damage to the dielectric, or to the isolator, respectively, can negatively influence the mechanical load-bearing capability of the latter and thus the long-term stability of the latter. Furthermore, the isolating or electrical properties, respectively, of the dielectric/isolator can be impeded.

Depending on the chosen treatment of the cable film, it is also possible for the cable film to be completely or continuously treated, respectively, that is to say for the cable film to be treated by the mentioned variants for the removal, or for the facilitation of the removal, also in regions of the cable film below the external layer when no impediment of the components of the electrical cable that are situated below the cable film is to be expected as a result.

Even when the treatment can optionally extend beyond the external layer and also into the internal layer, or completely through the cable film, respectively, for reasons of application it can be advantageous for only the external layer to be treated because the protective effect of the cable film in this instance can be used for protecting the components of the cable that are situated below the cable film during the treatment by the previously mentioned variants of the method.

It can be provided that, for facilitating the removal of the cable film, pre-processing is carried out at least in the region of the envisaged tearing position by one of the variants (thermal treatment, chemical treatment, abrasive treatment, scoring, suctioning procedure and/or stripping aid) before the cable film is removed.

In a design embodiment of the invention it can be provided that the second module, for facilitating the removal of the cable film, reduces the mechanical load-bearing capability is of the cable film at least in a partially ring-shaped manner, in portions, or in a completely encircling manner in the region of an envisaged tearing position.

For example, it can be provided that the mechanical load-bearing capability is reduced in a symmetrically encircling manner along the circumference of the cable film.

Additionally or alternatively, it can also be provided that the mechanical load-bearing capability of the cable film along the cable central axis is reduced completely or in portions in the region of the cable portion to be processed.

According to the design embodiment, "predetermined breaking points" be incorporated in the cable film, the number and circumference thereof are to be adapted to the cable, the cable film and optionally further parameters in an application-specific manner.

It can be provided for the cable film in the course of pre-processing in the region of the envisaged tearing position to be embossed and/or perforated at least in a partially ring-shaped manner, completely, or in portions in an encircling manner, along the circumference of the cable film.

In a refinement of the invention it can be provided that the second module at the envisaged tearing position incorporates in the cable film a partially ring-shaped or ring-shaped encircling tear in such a manner that the tear extends through the external layer and preferably at least partially also through an internal layer of the cable film that is situated below the external layer.

It can also be provided that a tear in a partially ring-shaped, completely, or in portions encircling manner along the circumference of the cable film and/or along the central axis of the cable is incorporated only in the external layer or in part of the external layer. It can however also be provided that a tear in a partially ring-shaped manner, completely or in portions encircling manner in the radial direction along the circumference of the cable film and/or along the central axis of the cable is incorporated completely through the cable film, that is to say through the external layer and through the internal layer. A tear which only partially invades the internal layer the cable film is also possible.

A tear in the cable film can represent a suitable predetermined breaking point, or reduce the mechanical load-bearing capability of the cable film at the tearing position to the desired extent. The type of the tear, that is to say the length, depth and width as well as optionally also the number of tears, can be established by the person skilled in the art so as to be specific to the application.

In a refinement of the invention it can be provided that the third module in the region of the piece of the cable film to be removed twists and/or bends the cable in such a manner that the cable film tears in a partially ring-shaped or ring-shaped encircling manner.

The basic concept of this refinement is to subject the cable film according to one of the mentioned variants for the pre-treatment in the context of the second module in a targeted manner to mechanical stress at the corresponding location or locations in such a manner that the cable film preferably (but not necessarily exclusively) tears at the envisaged tearing position.

It can be provided that a tear has been generated at least only in the external layer of the cable film as a result of the pre-treatment (thermal treatment, chemical treatment, abrasive treatment, scoring, suctioning process and/or stripping aid) by the second module. The external layer is often a plastics film while the internal layer, optionally additionally present, is often configured as a metal layer. An internal layer configured in such a manner can relatively easily break or tear, respectively, so as to generate a tear by twisting or bending, respectively.

In one design embodiment of the invention it can be provided that the thermal treatment comprises a melting process and/or a refrigeration process.

Parts of the cable film, in particular in the region of the external layer of the cable film, can be melted by a melting process. An evaporation of the cable film, in particular in the region of the external layer thereof, can also be provided instead of a melting process.

A refrigeration process can be advantageous in order for the brittleness of the cable film to be at least temporarily increased, in particular in the region of the external layer. To this end, a cryogenic technique with the aid of liquid nitrogen or similar refrigerants can in particular be provided.

In a refinement of the invention it can be moreover provided that a heated molding tool and/or at least one heating wire are/is used for the thermal treatment, in particular for fusing or melting the cable film.

The molding tool can preferably be an installation which is similar to a cutting tool and is of a concave shape. Independently of the shape of the forming tool, a blunt cutting knife can be provided, said blunt cutting knife not being able to cut through the cable film during the thermal preprocessing but only able to melt said cable film in a targeted manner by way of the contact faces of the blade. The tool blade can be, for example, narrower or smaller, respectively, than 10 mm, preferably smaller than 5 mm, for example also smaller than 2 or smaller than 1 mm. Preferably, however, the blade is broader than 1 mm and is approximately 5 mm. The heated molding tool can optionally also be the molding tool by way of which the cable sheath is severed for exposing the cable film.

It can also be provided that a heating wire, a heating coil or a similar installation is used, for example in a concave shape, or a shape adapted to the cable, respectively, or else configured so as to be linear.

It can in particular be provided that two, three, four, five or ore molding tools and/or heating wires are used which are disposed so as to encircle the cable in order for the cable film to be processed in a partially ring-shaped manner along the circumference of the cable film, or completely or in portions encircling said circumference.

It can be provided that the cable film is fused or melted only in the region of the external layer. It can however also be provided that the cable film is completely melted, or at least an internal layer which lies below the external layer is partially fused.

In a design embodiment it can be provided that the cable, the at least one molding tool and/or the at least one heating wire are/is rotated during the thermal treatment. It can in particular be provided that the at least one molding tool and/or the at least one heating wire during the thermal treatment is moved along the circumference of the cable so as to revolve about the cable.

Consequently, molding tools and/or heating wires or similar which have a linear construction, that is to say do not encompass or only partially encompass the cable, can in particular be used.

In a design embodiment it can moreover be provided that a melting temperature which is higher than the melting temperature of the external layer of the cable film but lower than the melting temperature of the internal layer of the cable film and/or the melting temperature of a braided cable shield or of an isolator/dielectric, respectively, (or any other component) of the cable, is used for the melting process.

It can however also be provided that a temperature which is higher than the melting temperature of the external layer and of the internal layer of the cable film, but lower than the melting temperature of a braided cable shield or of an isolator or dielectric, respectively (or any other component) of the cable, is chosen as the melting temperature. The cable film can in this way also be completely melted without damaging further components of the cable.

A melting temperature which does not negatively influence the cable sheath, a potentially present braided cable shield, a potentially present dielectric or an isolator, respectively, and/or the at least one inner conductor of the cable can be provided.

In principle, any arbitrary melting temperature can be used, in particular when the melting process is very short, and optionally provided only for melting the external layer of the cable film.

For example, the melting temperature of PET is 250° C. to 400° C., this being significantly below the melting temperature of aluminum and the silicone often used as the cable sheath. A melting temperature above 250° C. to 300° C. can thus be preferable. However, arbitrary melting temperatures can be used, for example a melting temperature in the range from 100° C. to 1000° C. (or more), 200° C. to 700° C. (or more), or 250° C. to 500° C. (or more). For example, a melting temperature of 300° C. to 400° C., in particular 360° C. to 380° C., can be advantageous.

For the thermal treatment it can also be provided that the cable film is fused or melted while using a directed (micro-) flame, for example a gas flame, and/or while using a laser. In this case, the cable is advantageously rotated during the treatment.

As has already been mentioned above, a chemical treatment may also be provided. An acid or a base can be used here, in particular an acid or a base which is aggressive only or substantially in terms of the cable film, in particular the external layer of the cable film. By using an acid or a base, the external layer and/or the internal layer of the cable film can be subtracted at least in the region of the envisaged tearing position, or at least be reduced in terms of the mechanical load-bearing capability thereof.

In principle however, any arbitrary chemical treatment can be provided for reducing the mechanical load-bearing capability, wherein a chemical reaction, in particular of the external layer of the cable film, can be initiated at least in the region of the envisaged tearing position, said chemical reaction being, for example, oxidation which reduces the mechanical load-bearing capability of the cable film.

In order for the cable film to be removed, or for the removal to be facilitated, the suctioning procedure can also be provided, wherein, while using a vacuum, a suction tool, for example a suction tool of concave shape, is engaged at least in the region of the envisaged tearing position, wherein the external layer and/or the internal layer, or the cable film, respectively, can be stripped or torn/torn off, respectively, at least in the region of the envisaged tearing position.

The suctioning procedure in particular for removing the cable film can also be used additionally, or in a facilitating manner, respectively, to other treatments.

Furthermore, an abrasive treatment, in particular a grinding or brushing process, can be provided at least in the region of the envisaged tearing position so as to partially subtract at least the external layer of the cable film, in particular so as to reduce the mechanical load-bearing capability of the cable film.

Finally, it is also possible for a stripping aid to be adhesively bonded in at least partially encircling manner along the circumference of the cable film, or for said stripping aid to be connected in a materially integral manner to the external layer of the cable film, respectively, as a result of which the cable film, or at least the external layer of the cable film, can be removed or tarn/torn off, respectively, when stripping the stripping aid. The remaining part of the cable film, for example the internal layer, subsequently has a reduced mechanical load-bearing capability and can optionally be suctioned or otherwise removed.

The incorporation of a ring-shaped, in portions or partially encircling, cut in the cable film by means of one or a plurality of knives, preferably a molding knife/molding knives, can also be provided. Cutting can optionally be performed in such a manner that the cable sheath is scored in a ring-shaped encircling manner and the film is simultaneously perforated at least in the region of an upper layer.

In a design embodiment it can in particular be provided that the mechanical load-bearing capability of the cable film is reduced by the pre-processing in the context of the second module in that the torsional strength and/or the flexural strength of the cable film, in particular of the external layer of the cable film, is reduced, and/or the brittleness of the cable film, in particular of the external layer of the cable film, is increased in order for the latter to more easily break.

The susceptibility to the formation of tears in the region in which the mechanical load-bearing capability has been reduced is in particular to be promoted.

In a design embodiment of the invention it can be provided that the third module has one, two, three, four or more actuators (in particular linear motors or driven cylinders) and/or at least one eccentric for twisting the cable portion to be processed and/or for bending said cable portion along at least one degree of freedom.

Four actuators are preferably provided for bending the cable portion to be processed in at least two degrees of freedom. As a result, a breakage or a tear, respectively, can be easily configured in technical terms in the region of the cable film to be processed, the mechanical load-bearing capability of said region having previously been reduced.

It can be provided for the free end of the cable portion to be impacted by means of the actuator, preferably in a temporal sequence. For example, a first actuator can be actuated so as to carry out a first impact on the free end, whereupon an opposite actuator performs an impact, and whereupon a further pair of actuator impacts the free end in the clockwise manner or the counterclockwise manner. The sequence of impacts can in principle be arbitrary.

It can also be provided that the actuators impact the free end of the cable portion multiple times, for example that each actuator impacts two, three, four or even more times.

It can be provided for the cable portion to be processed during twisting and/or bending to be fixed at one of the holding positions or at any other position along the cable central axis, in particular by means of a holding installation.

In a design embodiment of the invention it can be provided that a composite film from at least two individual layers is used as the cable film, wherein the internal layer is formed from at least one of the individual layers and the external layer is formed from the further individual layer/layers, and wherein the internal layer preferably has a higher mechanical brittleness (that is to say a tendency to break under mechanical influence) than the external layer.

Composite films can be understood to be, for example, metallized plastics films or else a plurality of individual films disposed on top of one another.

The method according to the invention thus also comprises the use of a suitable cable film for an electrical cable to be processed.

The method according to the invention can thus be adapted in an optimal manner to the electrical cable by way of the type of the cable film used. In principle however, any arbitrary electrical cable can be provided with an arbitrary cable film.

A cable film in the form of a composite film of two, three, four, five or more individual layers can in particular be used.

Furthermore however, a cable film can also be composed of a single base material. For example, a continuous polyester film, PET film or metal foil (for example, an aluminum foil or a copper foil) can be provided. In the case of a cable film from a single base material, the external layer can comprise a first part of the film thickness, and the internal layer can comprise a second part of the film thickness. The external layer can however also comprise the complete material. The cable film does not necessarily have to have an internal layer.

A composite film of two individual layers is preferably used as the cable film, wherein the internal layer is configured from the individual layer having the higher mechanical brittleness, and the external layer is configured from the individual layer having the lower mechanical brittleness. It can accordingly be provided that the internal layer of the cable film breaks more easily under mechanical stress than the external layer of the cable film.

In a design embodiment it can in particular be provided that a composite film from a plastics material, preferably PET (polyethylene terephthalate), and a metal, preferably aluminum, is used, wherein the external layer is formed by an individual layer of the plastics material, and the internal layer is formed from a further individual layer of the metal.

A cable film configured in this manner can thus have a brittle internal layer (for example, a copper or aluminum layer) and are mechanically resilient plastics external layer (for example, PET). The method according to the invention is particularly advantageous and effective for composite films of this type which are often used in electrical cables because the resilient external layer can preferably be removed or at least manipulated by one or a plurality of variants of the method so that said external layer becomes brittle. Because the internal layer of a composite film of this type in the absence of the protective external layer is sensitive in relation to mechanical stress, the cable film upon removal of the external layer at the envisaged tearing position and the compression according to the invention can subsequently be easily removed.

In a refinement of the invention it can be provided that the third module removes the piece of the cable film from the cable in that the piece of the cable film is brushed off, blown off, unwound, wiped off, and/or stripped conjointly with the piece of the sheath.

It can be advantageous, in particular for removing the cable film in an automated manner, for the cable film to be stripped conjointly with the cable sheath. To this end, it can be provided that the cable sheath, for example in the case of a cable portion to be processed in the form of a cable end piece, in the context of processing is scored in a ring-shaped encircling manner by the first module and is stripped longitudinally from the cable along the cable central axis substantially in the region of the envisaged tearing position, so as to expose the cable film in the region of the envisaged tearing position. The cable film can subsequently be pre-treated and the second module in order for the mechanical load-bearing capability of said cable film to be reduced. The cable film can subsequently be optionally compressed in the third module, as will yet be described hereunder, whereupon the cable sheath is completely stripped from the electrical cable in the longitudinal direction, or along the cable central axis, respectively.

In order for the piece of the sheath and/or the piece of the cable film to be stripped from the cable portion to be processed, or from the cable, the cutting installation which was previously used for the partial stripping of the cable sheath can be used, in particular one or a plurality of stripping knives which are actuated radially in the direction toward the cable central axis and subsequently axially strip the piece of the sheath and/or the piece of the cable film, for example in that a separate actuating installation extracts the cable, counter to the actuating direction, from the device while the cutting installation is partially closed.

In principle, a plurality of cable films can also be provided within an electrical cable; for example, a first cable film can be provided between the cable sheath and the braided cable shield, and a second cable film can be provided between the dielectric, or an isolator, respectively, and the inner conductor. The invention can also be used for removing a plurality of cable films, or pieces of cable films, from an electrical cable.

A design embodiment of the invention also relates to a method sequence for removing a cable film from a cable portion of an electrical cable to be processed, wherein the cable film in the cable portion to be processed is at least partially exposed, whereupon at least one tear that encircles the cable film in a ring-shaped manner is incorporated in the cable film in the region of the cable portion to be processed, whereupon the cable film is compressed and subsequently removed from the cable portion to be processed. It is provided here that at least the following steps are provided for incorporating the ring-shaped encircling tear:

pre-processing at least one external layer of the cable film that faces away from the cable central axis, at least in the region of at least one partially ring-shaped encircling, envisaged tearing position, wherein the mechanical load-bearing capability of the external layer in the region of the envisaged tearing position is at least reduced by the pre-processing;

twisting and/or bending the cable portion to be processed in such a manner that an internal layer of the cable film, situated below the pre-treated external layer, tears in a partially ring-shaped or ring-shaped encircling manner.

In an advantageous refinement of the invention it can be provided that the third module compresses the piece of cable film in the axial direction along the cable central axis before the piece of cable film is removed from the cable.

The inventor has presently recognized that stripping the cable film from the cable in the axial direction can be simplified in particular for long portions of the cable film to be removed, or in the case of cables having a large diameter, when the cable film is previously compressed, preferably counter to the stripping direction.

By compressing the cable film, the cable film can be initially loosened on the cable, this potentially simplifying subsequent stripping. For example, a materially integral or adhesive connection between the cable film and the underlying structures, for example a braided cable shield or an electrical isolator, can at least be released or loosened.

By compressing the cable film, the latter can be moreover loosened up, and as a result thereof it can be avoided that a wound cable film is radially further constricted during stripping and an existing force-fit between the cable film and the cable increases as the tensile force increases and thus counters the stripping action.

Compressing preferably takes place counter to the winding direction of the cable film.

In a refinement of the invention it can be provided that the third module indirectly compresses the piece of cable film in that the piece of sheath that encases the piece of the cable film is compressed.

In this case, the sheath can compress the cable film, in particular by way of an elongate portion that runs along the axial direction.

In particular when a composite film of a plastics material as the external layer and a metal as the internal layer is provided, it is to be expected that the cable film adheres more to the cable sheath than to a braided cable shield lying inside, for example. Accordingly, the cable film can advantageously be compressed by means of compressing the cable sheath and subsequently slide across the braided cable shield lying on the inside, or across an inner conductor, while said cable film is stripped conjointly with the cable sheath.

In principle, the (previously exposed) cable film can also be directly compressed. However, an even better result can be achieved by the indirect compression of the cable film while using an encasing sheath, because the radially restricted mobility of the cable film can enable a more targeted compression along the axial direction.

In a design embodiment, a cable sheath of the cable, or a gripping means extending in the axial direction, or a casing applied to the at least partially exposed cable film can be used as a sheath that encases the cable film.

The sheath encasing the cable film is preferably the cable sheath. This can however also be a braided cable shield or a dielectric shield, or an electrically isolating shield, respectively. Shield structures that are already present can thus advantageously be used for indirectly compressing the cable film.

It can however also be provided that a casing is applied to the previously exposed cable film so as to compress the cable film indirectly by compressing the casing. The casing in the axial direction preferably extends along a portion of the cable film to be removed, particularly preferably across the entire portion of the cable film that is to be removed.

The casing can be an elongate casing, for example a flexible hollow member, for example a tube. The casing can be configured so as to lie in a force-fitting manner at least in a partially ring-shaped manner, preferably in a completely encircling manner, about the cable film. The casing can be axially slit, for example, so as to be applied to the cable film by being elastically bent open. The casing can also be a sleeve, in particular a non-elastic hollow member.

A gripping means can also be provided for configuring the sheath. The gripping means can in particular be a component part of the holding installations and/or fixing installations which are yet to be described hereunder and which encompass the cable, the cable sheath or the cable film.

In a refinement of the invention it can be provided that the third module compresses the piece of cable film in that the piece of sheath is held at a first holding position, and wherein the sheath of the cable is held at a first fixing position that in the axial direction is spaced apart from the first holding position, whereupon the first holding position and the first fixing position are mutually converged.

The first fixing position is preferably situated outside the cable portion to be processed.

For example, the first holding position (and/or the further holding positions, yet to be described hereunder) can be situated on a severed front portion of the cable sheath (piece of the sheath, stripped piece), and the first fixing position can be situated on the portion of the cable sheath, or of the cable, respectively, which is not processed in the context of the invention.

It can be advantageous for the first holding position (or a further holding position, yet to be described hereunder) to be spaced apart in the axial direction from an exposed portion of the cable film. When the holding position is disposed so as to be excessively close to the exposed portion, or the open cable sheath, respectively, the compression can lead to the cable sheath being pushed back over the cable film, counter to the actuating direction of the cable. This issue can at least be reduced by a corresponding spacing of the holding position(s) from the exposed portion of the cable film. The spacing to be adhered to can be, for example, at least 10 cm, preferably at least 5 cm, particular preferably at least 1 cm. The spacing to be adhered to is preferably chosen in such a manner that the exposed portion of the cable film is not completely closed again by the displacement of the cable sheath. Particularly preferably, the cable sheath as a result of the compression movement is not to be displaced so far that the severed ends of the cable sheath contact one another and the piece of the cable sheath that is to remain on the cable is displaced counter to the actuation direction on the cable, as this can influence the length of stripping.

In a refinement it can be provided that the first holding position and the first fixing position are mutually converged in that the first fixing position is actuated toward the first holding position. The holding position in this case can be held so as to be immovable.

In a refinement it can also be provided that the first holding position and the first fixing position mutually converge in that the first holding position is actuated toward the first fixing position. The fixing position in this case can be held so as to be immovable.

A combination, thus a bilateral actuation, is also possible.

In a refinement it can moreover be provided that the third module compresses the piece of the cable film sequentially in a plurality of portions along the cable central axis.

Sequential compressing can be advantageous in particular in the case of comparatively long cable portions to be processed, or long portions of the cable film to be removed, respectively.

The compression can preferably take place excessively in a temporally offset sequence. It can in particular be provided that a first portion that is closest to the free end of the cable, or the portion of the cable to be processed, is first compressed, followed by a portion which counter to the actuation direction of the cable in the axial direction is downstream of the first portion. A reverse sequence when compressing a plurality of portions, or a chaotic sequence, can also be provided.

In one design embodiment it can be provided in particular that the cable film is compressed in two, three, four, five or more portions.

The number of portions to be compressed can be set by the person skilled in the art as a function of the length of the cable to be processed. For example, it can be provided that the cable film is compressed in portions which along the axial direction extend across a region of 2 cm or more, extend across a region of 3 cm or more, extend across a region of 4 cm or more, extend across a region of 5 cm or more, or extend across a region of 10 cm or more.

In a design embodiment n be provided that different holding positions and/or fixing positions which are spaced apart in the axial direction are used along the cable central axis, wherein the portions to be compressed run between holding pairs which are in each case formed by one holding position and one fixing position, whereupon the holding position and the fixing position for all holding pairs formed are mutually converged in a sequential manner.

A first fixing pair can be formed from the first holding position and the first fixing position, for example. A second fixing pair can be formed from the second holding position and the second fixing position, for example. A third fixing pair can be formed from the third holding position and the third fixing position, for example. A fourth fixing pair can be formed from the fourth holding position and the fourth fixing position, for example. A fifth fixing pair can be formed from the first holding position and the fifth fixing position, for example.

It can be provided that the first holding position is closest to the free end of the cable, or of the cable portion to be processed, respectively, wherein the second holding position, counter to the actuation direction of the cable, in the axial direction is downstream of the first holding position; this can be continued for further holding positions which are optionally present. The disposal or sequence, respectively, can be derived in an analogous manner for the fixing positions.

In a preferred design embodiment it can however be provided that the first fixing position is used for forming corresponding pairs with a plurality of holding positions, and wherein the first fixing position is sequentially actuated toward the respective holding positions while the holding positions remain unchanged.

Only one fixing position which forms respective fixing pairs with a plurality of holding positions is used. An encompassing action by a fixing installation can thus be particularly avoided.

A first fixing pair in this instance can be formed from the first holding position and the first fixing position, for example. A second fixing pair in this instance can be formed from the second holding position and the first fixing position, for example. A third fixing pair in this instance can be formed from the third holding position and the first fixing position, for example. A fourth fixing pair in this instance can be formed from the fourth holding position and the first fixing position, for example. A fifth fixing pair in this instance can be formed from the first holding position and the first fixing position, for example.

It can also be provided that the first holding position is used for forming corresponding pairs with a plurality of fixing positions, and wherein the first holding position is sequentially actuated toward the respective fixing positions while the fixing positions remain unchanged.

In a design embodiment of the invention it can be provided that the sheath is held at the at least one holding position and/or at the at least one fixing position by means of a cutting installation and/or by means of a molding tool.

For example, the cutting installation provided for stripping the sheath can be used so as to securely grip the cable, or the (cable) sheath, respectively, by partially scoring the sheath at the holding position and/or at the fixing position. However, fixing the cable or the sheath at the holding position or holding positions, or the fixing position or fixing positions, respectively, in a purely force-fitting manner can also be provided.

It can also be provided for the cable, or the sheath, respectively, to be gripped in a force-fitting manner at the holding position or holding positions and/or the fixing position or the fixing positions by means of a molding tool. The molding tool can in particular be a tool which is otherwise used in the context of the cable processing, for example one or a plurality of blunt blades for heating or melting, respectively, the cable film, as will yet be described hereunder.

In a design embodiment it can be provided that the fixing installation for compressing the cable film is actuatable toward the holding installation along an actuation direction for the cable to be processed.

It can however also be provided that the holding installation for compressing the cable film is actuatable toward the fixing installation counter to an actuation direction for the cable to be processed.

A simultaneous actuation of the fixing installation toward the holding installation and of the holding installation toward the fixing installation can also be provided.

The actuation direction is the direction along which the cable, for example proceeding from a cable drum, by way of the free end of said cable, or by way of the cable portion to be processed, respectively, is actuatable into the device.

In a design embodiment it can be provided that the holding installation and/or the fixing installation are/is configured for approaching a plurality of positions which are mutually spaced apart in the axial direction, so as to hold the sheath and, as a result of a relative actuation movement of the holding installation toward the fixing installation, to indirectly compress the cable film.

The holding installation is preferably configured as a stripping knife, a molding tool, or any other installation which can be radially actuated toward the cable.

The method according to the invention is particularly advantageously suitable for use with a device for processing an electrical cable because the method according to the invention discloses a possibility for removing the cable film from the electrical cable without damage to further components of the cable, said possibility being easy to implement in technical terms.

The invention also relates to a computer program product having program code means for carrying out a method according to the embodiments above and hereunder hen the program is executed on a control unit of a device for processing a cable.

The control unit can be configured as a microprocessor. Instead of a microprocessor, any arbitrary further installation for implementing the control unit and/or control installation can also be provided, for example one or a plurality of assemblies of discrete electronic components on a circuit board, a programmable logic controller (PLC), an application-specific integrated circuit (ASIC), or any other programmable circuit, for example also a field programmable gate array (FPGA), a programmable logic assembly (PLA), and/or a commercially available computer.

The invention also relates to an electrical cable, processed by a method according to one of the embodiments above and hereunder.

The invention moreover relates to an electrical cable which has been processed by a device according to the embodiments above and hereunder.

The invention furthermore relates to the use of a functional group of mutually independent modules for removing a piece of the sheath and a piece of the cable film from an electrical cable having a sheath and, lying therebelow, a cable film. It is provided here that a first module of the functional group is used for severing the piece of the sheath from the cable, and wherein a second module of the functional group is used for reducing the mechanical load-bearing capability of the cable film at an envisaged tearing position, and wherein a third module of the functional group is used for removing in an automated manner the piece of the sheath and the piece of the cable film from the cable.

Features which have already been described in the context of the device according to the invention can of course also be implemented for the method according to the invention, the system, the computer program product, electrical cable and the use, and vice versa. Furthermore, advantages which have already been mentioned in the context of the device according to the invention can also be understood to relate to the method according to the invention, the system, the computer program product, electrical cable or the use, and vice versa.

The described features of the modules of the functional group can moreover be interchangeable.

Furthermore, a plurality of modules, for example the first module and the second module, the second module and the third module, or the first module, the second module and the third module, can also be combined so as to form a smaller number of modules.

It can furthermore be provided for a single module to be subdivided into further sub-modules so as to design the processing of the cable to be even more modular. For example, the first module can be subdivided into a first sub-module and a second sub-module, wherein the first sub-module severs the piece of the sheath and the second sub-module carries out partial stripping.

The invention can moreover also relate to a control unit of a device for processing a cable, said control unit being specified for executing a computer program product having program code means so as to carry out a method according to the embodiments above and hereunder.

It is to be additionally pointed out that the terms such as "comprising", "having" or "with" do not preclude any other features or steps. Furthermore, terms such as "a/one" or "the", which suggest a singularity of steps or features, do not preclude a plurality of steps or features.

The features declared in the entire description and drawing relate to advantageous embodiments and variants of the abovementioned independent inventions.

The figures each show preferred exemplary embodiments in which individual features of the present invention are illustrated in combination with one another. Features of one exemplary embodiment may also be implemented separately from the other features of the same exemplary embodiment, and may accordingly be readily combined by an expert to form further useful combinations and sub-combinations with features of other exemplary embodiments.

Elements of identical function are denoted by the same reference designations in the figures.

In the figures, in each case schematically:

Figure 1:
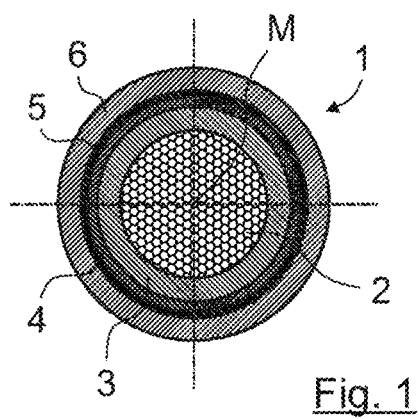
FIG. 1 shows a cross section of an electrical cable having an inner conductor, a braided cable shield and a cable film.

Illustrated in the cross section in FIG. 1 is an electrical cable to which the method according to the invention is to be advantageously applied. The electrical cable 1 which is illustrated in a purely exemplary manner and highly schematic in terms of the size ratios is a coaxial cable having an inner conductor 2 which is electrically isolated from a braided cable shield, or outer conductor 4, respectively, by an isolator/dielectric, or insulation material 3, respectively. The insulation material 3 can be silicone rubber, for example. A cable film 5 is disposed about the braided cable shield 4. The electrical cable 1 is finally surrounded by a cable sheath 6. All components of the electrical cable 1 are disposed coaxially in relation to a common cable central axis M. The braided cable shield 4 presently assumes the task of an electromagnetic shield and of the electrical return conductor and can be constructed, for example, from copper having a protective tin layer ("skin") that is applied to the external circumference.

In principle, the invention can be used for cables of arbitrary construction, in particular also for a cable in which the braided cable shield, or the outer conductor 4, respectively, is disposed directly below the cable sheath 6 and directly above the cable film 5. The insulation material 3 can in this case follow directly below the cable film 5, for example.

Depending on the construction of the cable film 5, the cable film 5 can even improve the electromagnetic shield, guarantee the mechanical stability and/or the tightness, in particular in relation to moisture, and prevent wedging of the cable sheath 6 on the braided cable shield 4, or on the individual strands of the braided cable shield 4, respectively, as a result of which peeling the cable sheath 6 from the braided cable shield 4 when stripping can be made possible in the first place.

It is known that a cable film 5 of this type which can in principle be disposed at any arbitrary location within the cable 1, for example also between the braided cable shield 4 and the insulation material 3, or between the insulation material 3 and the inner conductor 2, can be removed only manually and also only with high complexity in the course of assembling a cable. The reason therefor is the intended high mechanical load-bearing capability of the cable film 5.

In principle, a plurality of cable films 5 can also be provided within the electrical cable 1; for example, a further cable film 5 can be provided between the insulation material 3 and the inner conductor 2 (this not being the case in the exemplary embodiment). The invention can thus also be used for removing a plurality of cable films 5 from an electrical cable 1.

Figure 2:
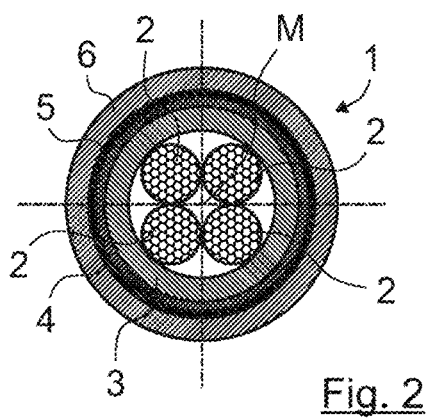
FIG. 2 shows a cross section of an electrical cable having four inner conductors, a braided cable shield and a cable film.
Figure 3:
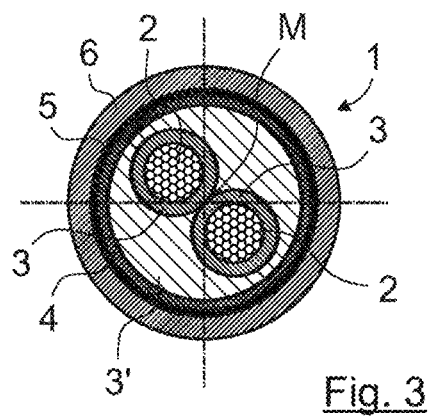
FIG. 3 shows a cross section of an electrical cable having two inner conductors, a braided cable shield and a cable film.

The electrical cable 1 illustrated in FIG. 1 is merely one of a multiplicity of electrical cables 1 the cable film(s) 5 of the latter being able to be removed while using the method according to the invention. FIGS. 2 and 3 are to serve as a further example. In principle however, the invention is not to be understood to be limited to the use with a specific type of cable 1.

FIG. 2 shows a cable 1 which is substantially identical to that in FIG. 1. Said cable 1 of FIG. 2 however has four inner conductors 2 which are in each case electrically isolated from one another (not illustrated for the sake of simplicity). The invention is thus in particular not to be understood to be limited to the use of a cable 1 having a specific number of inner conductors 2. Furthermore, the invention is not to be understood to be limited to a cable 1 in which an insulation material 3 and/or braided cable shield 4 are present in the first place. The invention can also be used, for example, for removing the cable film 5 of an electrical cable 1 which has only one or a plurality of inner conductors 2 in the form of strands which are in each case or conjointly surrounded by a cable film 5.

FIG. 3 in an exemplary manner shows a further electrical cable 1 which can be processed according to the invention. The electrical cable 1 illustrated is particularly suitable as a cable 1 for use with electrical vehicle propulsion systems. The cable 1 has two inner conductors 2 which are in each case surrounded by the insulation material 3. In order for an ideally round overall cross section to be obtained for the cable 1, the two separately isolated inner conductors 2 are surrounded by a filler material 3' (filler). The braided cable shield 4 which is encased by the cable film 5 runs on the filler material 3'. A cable sheath 6 which encases the cable film 5 is finally also provided for the cable 1 of FIG. 3.

A processing of a cable by method steps according to the invention is demonstrated in an exemplary manner in FIGS. 4 to 9.

Figure 10:
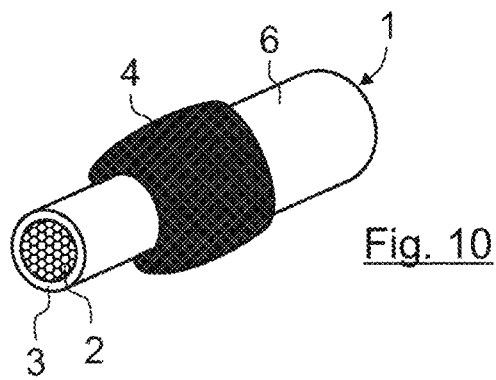
FIG. 10 shows the electrical cable according to FIG. 9 having an inverted braided cable shield.

FIG. 10 shows a further optional step in order for the braided cable shield 4 to be inverted. To the extent that the braided cable shield 4 is disposed directly below the cable sheath 6 and above the cable film 5, the inversion of the braided cable shield 4 can take place in the context of exposing the cable film 5, or else optionally after the cable sheath 6 has been stripped.

FIGS. 4 to 10 show in each case the electrical cable 1 having the cable portion A to be processed in an isometric illustration. The illustrated cable portion A to be processed is presently an end portion of the electrical cable 1.

Figure 4:
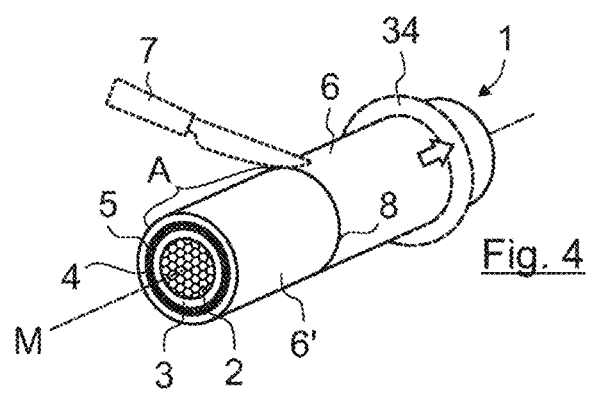
FIG. 4 shows an isometric illustration of an electrical cable according to FIG. 1 having a cable sheath that is scored in a ring-shaped encircling manner.
Figure 5:
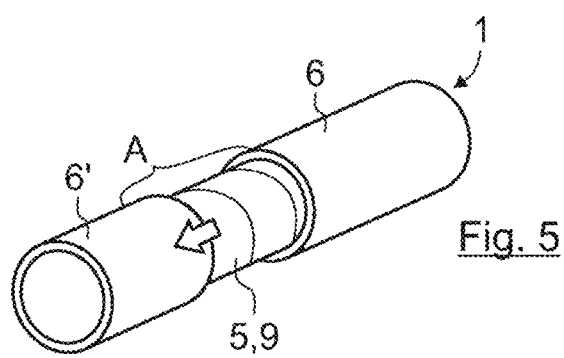
FIG. 5 shows an isometric illustration of the electrical cable according to FIG. 4 having a partially stripped cable sheath and an exposed cable film.

It can be provided that the cable film 5 is initially at least partially exposed in the cable portion A to be processed, as is illustrated in FIGS. 4 and 5, for example. This preferably takes place in the context of processing the cable by a first module MD1 of a functional group 32 of mutually independent modules, as will yet be described hereunder in particular in the context of FIG. 24. To this end, the cable sheath 6, in particular while using a knife 7 indicated only in a schematic manner, can be scored in an at least partially encircling manner in a manner known, preferably in such a manner that one or a plurality of webs remain, or a narrow encircling ring of the cable sheath remains, and the underlying cable film 5 thus ideally remains undamaged. FIG. 4 shows a fully encircling cut 8 which along the longitudinal axis, or the cable central axis M, defines the length of the cable portion A to be processed.

The scoring and the stripping, or the partial stripping, respectively, of the cable sheath 5 by the knife 7 is preferably performed in an automated manner.

In the context of this method step, or in the context of the processing by the first module MD1, respectively, or in the context of the processing of the cable 1 by a mounting module 33, upstream of the first module MD1, it can optionally be provided that at least one plug connector part is mounted on the cable 1, for example having a seal ring 34 which is illustrated with dashed lines in FIG. 4.

It is illustrated in FIG. 5 that, upon incorporating the cut 8, the severed cable sheath, or the severed piece 6' of the cable sheath, respectively, in the direction of the arrow is at least in part stripped from the electrical cable 1 in the longitudinal direction, or in the axial direction (along the cable central axis M), in such a manner that the cable film 5 is at least partially exposed and becomes accessible for the following method steps. This method step can also take place in the context of processing the cable by the first module MD1.

Figure 21:
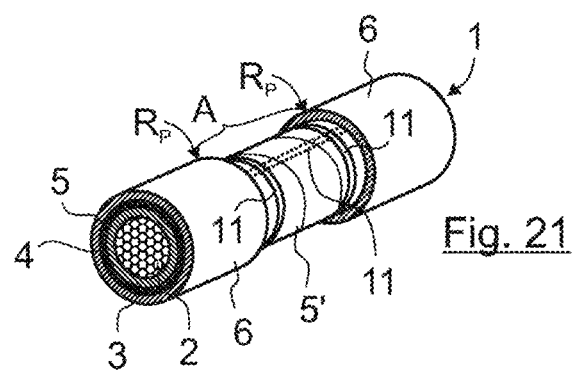
FIG. 21 shows the electrical cable according to FIG. 20 having an exposed and treated cable film in a window-shaped cable portion.

In most instances, the cable film 5 is wound in the form of strips, or helically wound, respectively, onto the components of the cable 1 that are situated below the former, this presently being the braided cable shield 4, as is illustrated in FIGS. 6 to 10 and in FIGS. 21 to 23. This is however not mandatory.

Figure 6:
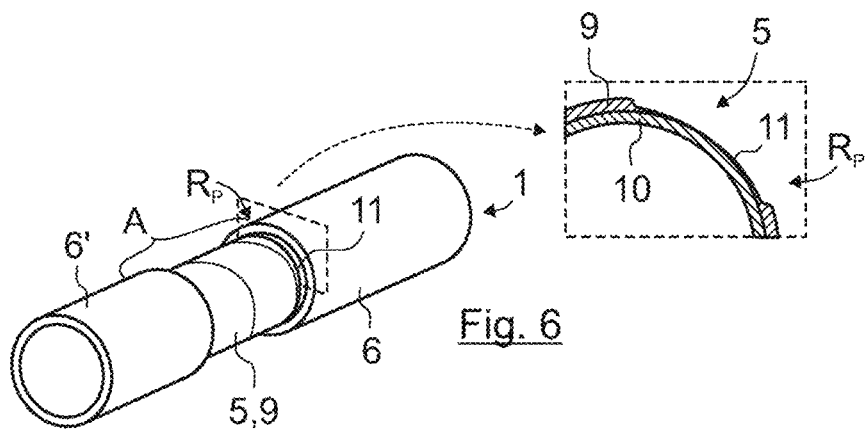
FIG. 6 shows the electrical cable according to FIG. 5 after partially annular preliminary processing of the cable film for reducing the mechanical load-bearing capability of the latter.

As is indicated in FIG. 6, upon exposing the cable film 5 and prior to removing the cable film 5, it is provided in the exemplary embodiment, at least in an external layer 9 of the cable film 5 that faces away from the cable central axis M, that the mechanical load-bearing capability of the cable film 5 is reduced at least in the region of an envisaged tearing position $R_P$. The envisaged tearing position $R_P$ is indicated in FIG. 6 and is preferably located on or close to the cutting edge of the remaining cable sheath 6. This preferably takes place in the context of processing the cable by a second module MD2 of the functional group 32, downstream of the first module MD1, as will yet be described hereunder in particular in the context of FIG. 24.

Furthermore shown in FIG. 6 is an enlarged portion of the envisaged tearing position $R_P$, showing a schematic section through the cable film 5, wherein surrounding and inner parts of the cable 1 are not illustrated for the sake of simplification. Illustrated in the detailed view are first the external layer 9 of the cable film 5, and also an internal layer 10 of the cable film 5 that is situated below the external layer 9. The cable film 5 illustrated in the exemplary embodiment is a composite film of at least two individual layers, wherein the internal layer 10 is formed from at least one of the individual layers, and the external layer 9 is formed from the further individual layer/layers (presently a second individual layer), and wherein the internal layer 10 is preferably formed in such a manner that the latter in mechanical terms breaks more easily than the external layer 9. It can be in particular provided here that a composite film of a plastics material, preferably PET, and a metal, preferably aluminum or copper, is used, wherein the external layer 9 is composed of an individual layer of the plastics material, and the internal layer 10 is composed of a further individual layer of the metal.

In principle, it can also be provided that a cable film 5 is composed of only a single individual layer, or of a single base material, respectively. The external layer 9 here can comprise the complete cable film 5 or else a sub-region, wherein the internal layer 10 comprises the remaining sub-region, or no internal layer 10 is provided. It can also be provided that a plurality of cable films 5 which are in each case composed of an individual layer (or a plurality of individual layers) are used so as to be layered on top of one another. This is also to be understood to be a cable film 5, or a composite film, respectively, according to the invention.

In the exemplary embodiment it is provided that the mechanical load-bearing capability is reduced at least in a partially ring-shaped manner, completely or encircling in portions along the circumference of the cable film 5.

The mechanical load-bearing capability of the cable film 5 can be reduced in particular by (partially) removing the external layer 9, embossing the external layer 9, or perforating the external layer 9. It can be provided, for example, that a tear 11 at the envisaged tearing position $R_P$ is incorporated in the cable film 5 in such a manner that the tear 11 extends through the external layer 9 (as is illustrated in FIG. 6) and preferably at least partially through the internal layer 10 of the cable film 5 that is situated below the external layer 9.

In the exemplary embodiment, the mechanical load-bearing capability of the cable film 5 can be reduced in particular in that the torsional strength and/or the flexural strength of the cable film 5, in particular of the external layer 9 of the cable film 5, is reduced, and/or in that the brittleness of the external layer 9 of the cable film 5 is increased. A tear 11, or any other optically visible influence on the cable film 5 here is not mandatory—the mechanical influence can also take place in an invisible manner, for example by chemical modifications in the cable film 5.

Illustrated in the detailed view of FIG. 6 is a partially ring-shaped tear 11 at the envisaged tearing position $R_P$, or the external layer 9 has been subtracted/removed in a partially ring-shaped manner along the circumference of the cable film 5, respectively. The predetermined breaking point created as a result can optionally be sufficient for the cable film 5 to be subsequently easily removed. However, the mechanical load-bearing capability is preferably ideally reduced in a completely encircling manner along the circumference of the cable 5, or the external layer 9 is ideally completely subtracted, respectively. A partially ring-shaped tear 11 is presently shown predominantly for highlighting and illustrating the external layer 9 and the internal layer 10 in a common illustration.

According to the invention, a thermal treatment, a chemical treatment, and an abrasive treatment, a suctioning procedure and/or adhesive bonding and stripping of a stripping aid 12 can be provided in order for the cable film 5 to be removed, or for facilitating the removal of the cable film 5, in particular in that the mechanical load-bearing capability of the cable film 5 is reduced, in particular at the tearing position $R_P$, by the aforementioned measures. The cable film 5 can also be scored.

The thermal treatment here can in particular comprise a melting process. Two possibilities of thermal pre-processing in the form of a melting process are schematically illustrated in FIGS. 13 to 15.

Figure 13:
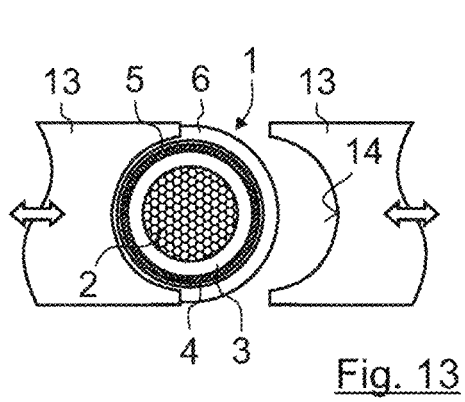
FIG. 13 shows the use of two heated molding tools for the thermal treatment of the cable film.

It is shown in FIG. 13 how two heated molding tools 13 in the region of the envisaged tearing position $R_P$ are moved to the cable film 5, or to the cable 1, respectively, on both sides. The heated contact faces 14 of the molding tools 13 can be, for example, blunt tool blades, for example having a width of 1 mm or more, which are however not capable of scoring the cable film 5. As an alternative to the use of two molding tools 13, only one molding tool 13, or three, four or even more molding tools 13 can be used; after the melting, webs along the circumference of the cable film 5 between the molding tools 13 can optionally also remain in the external layer 9 of the cable film 5. When one molding tool, or a plurality of molding tools 13, that does/do not fully comprise the cable film 5 have/has been used, the molding tool 13 and/or the electrical cable 5 can be optionally rotated during the thermal pre-processing so as to enable melting along the circumference of the cable 1.

In principle, it can be optionally provided that the at least one molding tool 13 during the processing is moved along the circumference of the cable 1 about the cable 1.

Figure 14:
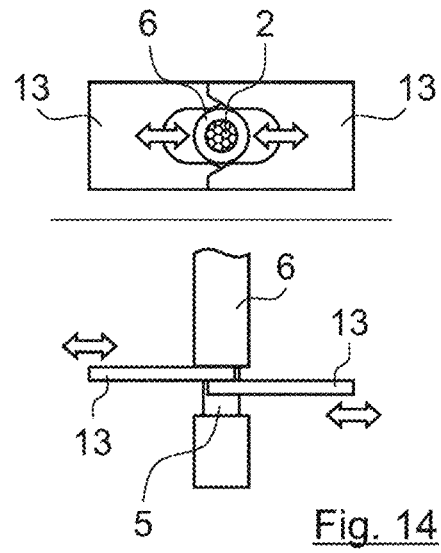
FIG. 14 shows a further example of the use of two heated molding tools for the thermal treatment of the cable film.
Figure 15:
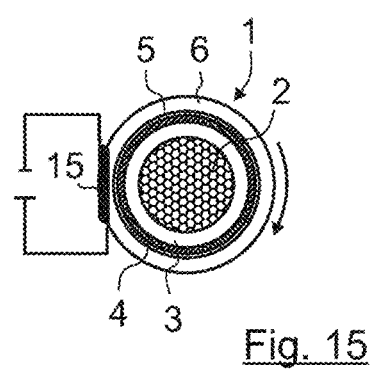
FIG. 15 shows the use of a heating wire for the thermal treatment of the cable film.

A further potential design embodiment for the thermal treatment in which two heated molding tools 13 are again actuated toward the cable film 5, or toward the cable 1, respectively, on both sides is illustrated in FIG. 14. The molding tools 13 here are offset in the axial direction and, when actuated toward the cable 1, move past one another. Advantageous centering of the cable 1 between the molding tools 13 can advantageously be enabled as a result, this potentially improving the processing of the cable film 5.

A further example of a thermal treatment for fusing or melting the cable film 5, at least in the region of the envisaged tearing position $R_P$, is illustrated in FIG. 15. Instead of a heated molding tool 13, a heating wire, or a heating coil 15, respectively, is used here, wherein the cable 1 (alternatively or additionally also the heating wire 15) can be rotated during the pre-processing, as is indicated by the arrow in FIG. 15.

A melting temperature which is higher than the melting temperature of the external layer 9 of the cable film 5, but lower than the melting temperature of the internal layer 10 of the cable film 5 and/or the melting temperature of other components of the cable 1, in particular of the braided cable shield 14, of the insulation material 3 and/or of the at least one inner conductor 2 of the cable 1 is preferably used for the melting process. For example, a melting temperature of 100° C. to 1000° C. or more, preferably 200° C. to 800° C., particularly preferably 300° C. to 700° C., and most particularly preferably 300° C. to 400° C., for example 360° C. to 380° C., can be provided. The melting temperature can be controllable.

As opposed to the detailed view in FIG. 6, it can also be provided that not only the external layer 9 of the cable film 5, but also the internal layer 10 of the cable film 5 is subtracted, or the mechanical load-bearing capability of the latter is reduced (by an arbitrary variant according to the invention for removing or facilitating the removal of the cable film).

For example, it can be provided that a melting temperature is chosen in such a manner that the external layer 9 and the internal layer 10 of the cable film 5 are melted while the components of the electrical cable 1 that are situated therebelow remain undamaged.

The thermal treatment can also be designed in such a manner that the cable film 5 is firmly removed, or melted, across at least a partial length, optionally across the entire length of the cable portion A to be processed.

In the course of a thermal treatment it can also be provided that a refrigeration process is carried out. For example, icing while using liquid nitrogen or any other refrigerant can be provided here at least in the region of the envisaged tearing position $R_P$, as a result of which the brittleness at least of the external layer 9 of the cable film 5 can be increased.

Further possibilities for reducing the mechanical load-bearing capability of the cable film 5, optionally also for the direct complete removal of the cable film 5, are schematically illustrated in FIGS. 16 to 19.

Figure 16:
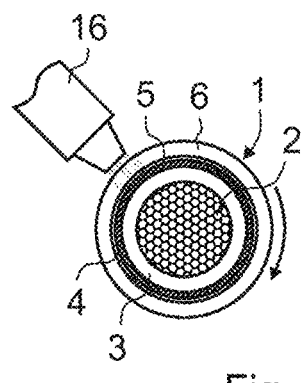
FIG. 16 shows the use of a supply installation for chemicals for the treatment of the cable film.

A supply installation 16 for chemicals is shown in FIG. 16, as a result of which a chemical treatment can take place. For example, an add, a base or any other chemical which initiates a reaction with the material of the cable film 5, in particular with the external layer 9, for example in the form of oxidation, can be supplied by the supply installation 16, as a result of which the mechanical load-bearing capability of the cable film 5 is reduced. The mentioned liquid nitrogen can furthermore be supplied by the supply installation 16 (however, a dedicated refrigerated supply installation can also be is provided to this end). The cable 1 (or the supply installation 16) can preferably be rotated while the chemical is being supplied.

Figure 17:
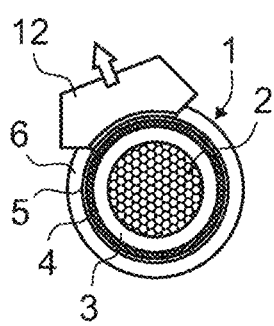
FIG. 17 shows the use of a stripping aid for the treatment of the cable film.
Figure 18:
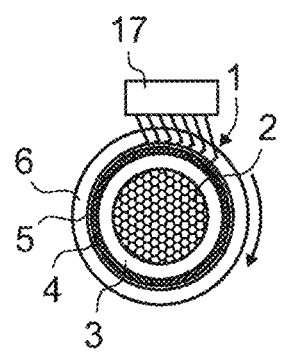
FIG. 18 shows the use of a wire brush for the treatment of the cable film.

Pre-processing by way of a stripping aid 12 is illustrated in FIG. 17. It is provided here that the stripping aid 12 is adhesively bonded to the external layer 9 of the cable film 5, or connected in a materially integral manner, respectively, to the external layer 9, at least in the region of the envisaged tearing position $R_P$, whereupon the stripping aid 12 is moved in the direction of the arrow, in the radial direction, away from the cable central axis M, as a result of which the cable film 5, but at least the external layer 9 of the cable film 5, tears/tears off. Optionally, the cable film 5 can already be completely removed as a result thereof. A plurality of stripping aids 12, for example two, three, four or even more stripping aids 12, can also be disposed so as to be distributed along the circumference of the cable film 5. The stripping aid(s) 12 can have a concave shape so as to be able to be adhesively bonded to the cable film 5 over an ideally lame area. A rotating movement of the stripping aid 12 of the cable 1 can optionally also lead to the cable film 5 tearing.

In a similar, alternative variant, a suctioning process can also be provided instead of the stripping aid 12. The cable film 5, or the external layer 9 of the cable film 5, respectively, here can be suctioned by a suctioning installation (not illustrated) at least in the region of the envisaged tearing position $R_P$ and as a result thereof be torn/torn off or stripped, respectively.

As an example of an abrasive treatment, a wire brush 17 which is moved across the surface of the cable film 5, or across the external layer 9, respectively, for example in that the electrical cable 1 is rotated, the external layer 9 and/or the internal layer 10 as a result thereof being subtracted, is schematically illustrated in FIG. 17. Instead of a wire brush 17, comparable abrasive means, for example a grinding installation or a plastics brush, can also be provided.

Figure 19:
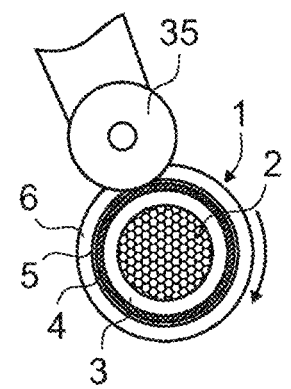
FIG. 19 shows the use of a circular knife for the treatment of the cable film.

With a view to scoring the cable film 5, the knife 7 which has been indicated and described in FIG. 4 can be reused, for example, or the cutting installation 22 yet to be described hereunder can be used. A circular knife 35 as is illustrated in FIG. 19 can preferably also be used for treating the cable film 5. The circular knife 35 can roll on the circumference of the cable 1, or on the circumference of the cable film 5, respectively, as a result of which damage to components of the cable 1 that are situated below the cable film can be avoided. The circular knife 35 can selectively be moved about the cable 1, or the cable 1 can be rotated during the processing, as is illustrated. Moving or rolling the circular knife 35 along the circumference of the cable film 5 and simultaneously rotating the cable 1 is also possible.

Figure 7:
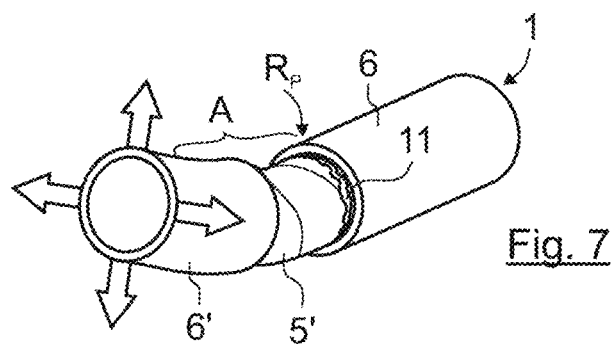
FIG. 7 shows the electrical cable according to FIG. 6 during the bending of the cable portion to be processed.

Prior to removing the cable film 5, it can be provided that the cable portion A to be processed is twisted and/or bent in such a manner that the cable film 5 in the cable portion A, in particular at the envisaged tearing position $R_P$, tears in a ring-shaped encircling manner, as is indicated in FIG. 7. This preferably takes place in the context of processing the cable by a third module MD3 of the functional group 32, downstream of the second module MD2, as is yet to be described hereunder in particular in the context of FIG. 24. In particular when the brittleness of the cable film 5, thus the tendency to break under mechanical stress, is increased by reducing the mechanical load-bearing capability at least of the external layer 9 of the cable film 5 at least in the region of the envisaged tearing position $R_P$, the cable film 5 easily tears at the envisaged tearing position $R_P$ upon corresponding mechanical stress. An optionally already existing, for example partially ring-shaped encircling, tear 11 which has been incorporated by one of the aforementioned treatments, in particular as per FIGS. 12 to 19, can be reinforced as a result thereof, until the cable film 5 has been completely torn. A tear 11 may however be formed in the first place only as a result thereof. After the mechanical stress on the cable portion A to be processed, the cable film 5 is preferably completely severed.

Figure 11:
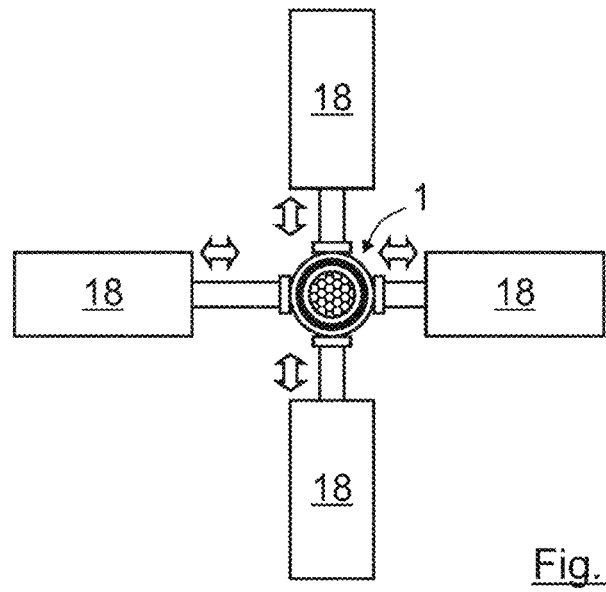
FIG. 11 shows the use of four actuators for bending the cable portion to be processed.

Actuators can be used for twisting and/or bending the cable portion A to be processed. For example, FIG. 11 shows the use of four linear actuators 18 for bending the cable portion A to be processed in two degrees of freedom. As a result thereof, a movement as illustrated by the arrows in FIG. 7 can be generated. Of course, arbitrary actuators can be provided for carrying out a movement of this type or a similar movement that leads to mechanical stress on the cable film 5 and ultimately to the latter tearing.

Figure 12:
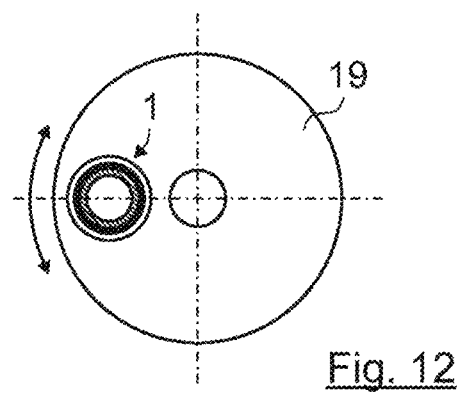
FIG. 12 shows the use of a rotational installation, or an eccentric, respectively, for twisting or bending, respectively, the cable portion to the processed.

For example, a rotational installation, for example an eccentric 19, can also be used for twisting the cable portion A to be processed, as is illustrated in FIG. 12. The illustration of FIG. 12 in terms of the dimensions thereof is exaggerated and is to be understood as merely schematic It can be provided for the cable 1 during the method step of twisting and/or bending to be fixed in the region of the envisaged tearing position $R_P$. For example, the previously described molding tools 13 in the case of a thermal treatment of the cable film 5 can still remain closed until the method step of twisting and/or bending is completed.

After the method step of twisting and/or bending, preferably prior to further method steps, it can moreover be provided for the cable 1, or at least the cable portion A to be processed, first to be straightened. For example, two molding tools or blunt blades can be actuated toward the cable 1 to this end.

Figure 8:
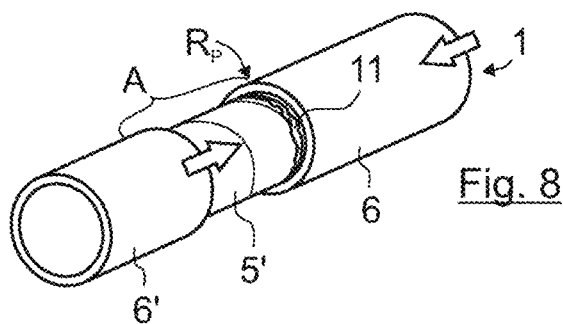
FIG. 8 shows the electrical cable according to FIG. 7 during compression according to the invention.
Figure 9:
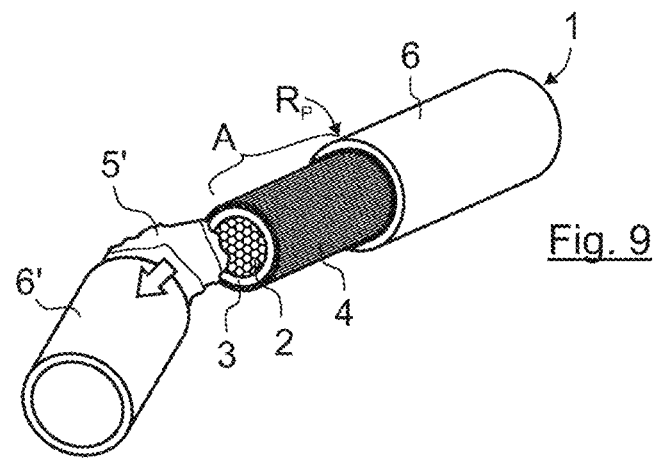
FIG. 9 shows the electrical cable according to FIG. 8 during the stripping of the cable film conjointly with the cable sheath.

After tearing, the cable film, or the severed piece 5' of the cable film, respectively, can optionally be compressed in the axial direction along the cable central axis M, as is indicated by the two arrows in FIG. 8. This preferably likewise takes place in the context of processing the cable by the third module MD3 of the functional group 32.

The compression takes place prior to the piece 5' of the cable film being removed from the portion A to be processed, or otherwise however at any arbitrary point in time during the processing of the cable. The previously described sequence of the method steps is thus to be understood as merely exemplary. The cable film 5 or the piece 5' of the cable film is preferably compressed once the cable film 5 has at least been partially exposed, particularly preferably once the mechanical load-bearing capability of the cable film 5 has been reduced, and most particularly preferably once the piece 5' of the cable film has been torn off by the twisting and/or bending.

The piece 5' of the cable film is preferably indirectly compressed in that a sheath encasing the cable film 5 is compressed. In the exemplary embodiment, the piece 5' of the cable film is indirectly compressed by compressing the piece 6' of the cable sheath. In principle however, indirect compressing can also take place by compressing another sheath, for example by compressing a casing (not illustrated) that has been subsequently applied to the exposed cable film 5.

After compressing, the piece 5 of the cable film is finally removed from the cable portion A to be processed. This also preferably takes place in the context of processing the cable by the third module MD3 of the functional group 32. When the cut-off cable sheath, or the piece 6' of the cable sheath, respectively, has not yet been completely removed from the cable 1, as is illustrated in the exemplary embodiment, the piece 5' of the cable film can be stripped conjointly with the piece 6' of the cable sheath (cf. FIG. 9) because the cable film 5, depending on the embodiment, in most instances readily adheres to the cable sheath 6. In principle however, the piece 5' of the cable film after compressing can be removed from the cable portion A to be processed in an arbitrary manner, for example in that the piece 5' of the cable film is brushed off, blown off, unwound and/or wiped off. It can also be provided for the piece 5' of the cable film and/or for the piece 6' of the cable sheath to be removed in that the cutting installation 22, for example a knife 7 described in FIG. 4, is actuated radially toward the cable central axis M and an axial movement of the cable 1 and/or of the knife 7 is subsequently carried out in order for the piece 5' of the cable film and/or the piece 6' of the cable sheath to be wiped off. The component of the electrical cable 1, presently the braided cable shield 4, that is situated below the cable film 5 is subsequently exposed.

Once the piece 5' of the cable film has been removed, further customary and known measures can be provided for assembling or for further stripping the electrical cable 1 (depending on the requirement). It is illustrated in an exemplary and schematic manner in FIG. 10 how the exposed braided cable shield 4 has been folded back toward the rear along the cable central axis M so as to be fastened to a plug connector (not illustrated) and to be electrically connected to the latter, for example. Subsequently, the insulation material 3 could still be removed, and the inner conductor 2 will be exposed and be contacted by a plug connector not illustrated.

It can also be provided that the functional group 32 has a fourth module MD4, downstream of the third module MD3, which is configured for attaching a support sleeve or any other component of a plug connector to the cable 1.

Even further modules can be provided in the context of the processing of the cable 1 by the functional group 32.

Figure 20:
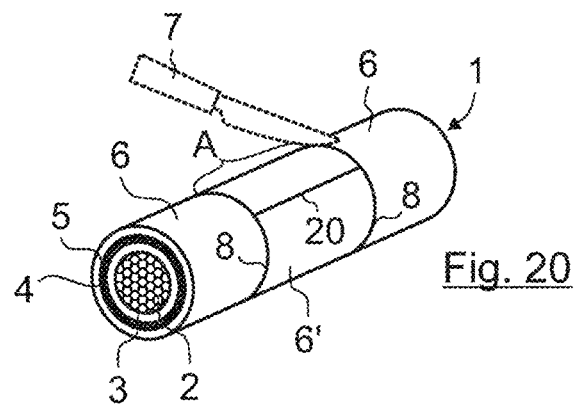
FIG. 20 shows an isometric illustration of an electrical cable according to FIG. 1 during the removal of the cable sheath in the form of a cable window.

The cable portion A to be processed can be a cable end piece already illustrated. This can however also be a cable window as is illustrated in FIGS. 20 and 21. A cable window here can be stripped in a known manner, for example in that two ring-shaped encircling cuts 8 and one longitudinal cut 20 are incorporated in the cable sheath 6 between the ring-shaped cuts 8, as is indicated in FIG. 20. These method steps also preferably take place in an automated manner. Subsequently, the cable sheath, or a severed piece 6' of the cable sheath, respectively, can be removed as a result of which the cable film 5, which in the exemplary embodiment is situated therebelow, is exposed. Finally, the steps already mentioned above can be carried out in an analogous manner in order for the cable film 5 to be removed. In this case, for example, two tearing positions RP can also be provided, or it can be provided that the mechanical load-bearing capability is reduced in an at least partially ring-shaped manner, completely, or in portions encircling, at two locations disposed so as to be distributed along the cable central axis M, respectively, whereupon the cable film 5 is twisted between the envisaged tearing positions RP, for example, as a result of which said cable film 5 tears off at the envisaged tearing position $R_P$. The cable film 5 can subsequently be compressed, for example in that the two ends of the open cable sheath 6 are converged so as to indirectly compress the cable film 5. The severed central portion of the cable film 5 can consequently be easily removed. Alternatively or additionally, it can also be provided for the mechanical load-bearing capability of the cable film 5 to be reduced along the cable central axis M, as is indicated by the tearing position $R_P$ illustrated by dashed lines in FIG. 21.

Figure 22:
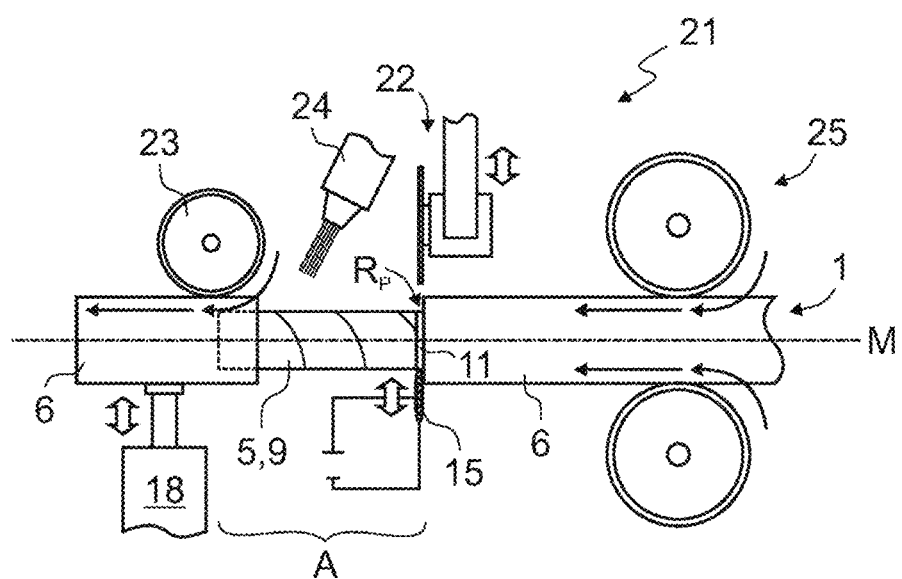
FIG. 22 shows a device for removing in an automated manner a cable film from a cable portion of an electrical cable to be processed.

A device 21 for removing in an automated manner the cable film 5 from a cable portion A of an electric cable 1 to be processed is schematically illustrated in FIG. 22. FIG. 22 in terms of an overview shows a device in which, inter alia, the features of the modules 33, MD1, MD2, MD3, MD4 of the functional group 32 have been combined. According to the invention, the features which have been illustrated in combination in FIG. 22 are however preferably distributed among the individual modules 33, MD1, MD2, MD3, MD4 of the functional group 32. In the context of the invention, an arbitrary combination of the features shown in the context of FIG. 22.

Provided can be at least one heating wire 15, at least one molding tool 13, at least one refrigerated supply installation (not illustrated), at least one stripping aid 12, at least one suctioning installation (not illustrated) and/or at least one supply installation 16 for chemicals, so as to treat at least one external layer 9 of the cable film 5, the latter in the region of the cable portion A to be processed being at least partially exposed, that faces away from the cable central axis M, so as to remove the cable film 5 or, for facilitating the removal of the cable film 5, so as to reduce the mechanical load-bearing capability of the latter at least in the region of the envisaged tearing position $R_P$. Means for twisting and/or bending the cable portion A to be processed (for example at least one linear actuator 18 and/or one rotational installation, or an eccentric 19, respectively) can be provided here.

A cutting installation 22 for scoring and optionally for stripping, or for partially stripping, respectively, the cable sheath 6 can finally also be provided. All components can be configured so as to be actuatable, as is indicated by the respective double arrows in FIG. 22. As a means for twisting and/or bending the cable portion to be processed, a single linear actuator 18 is illustrated in an exemplary manner in FIG. 22; as has been described above however, an arbitrary number of actuators of an arbitrary construction mode can be provided.

Furthermore illustrated is a roller 23 for stripping off the piece 6' of the cable sheath. When the piece 5' of the cable film is not, or not completely, removed by the piece 6' of the cable sheath being stripped off, a nozzle 24 for blowing off the piece 5' of the cable film from the cable 1 while using compressed air can also be provided, for example.

In a preferred embodiment it can be provided for the cable sheath 6, or the piece 6' of the cable sheath/the stripped piece, respectively, to be stripped conjointly with the piece 5' of the cable film from the cable portion A to be processed. A gripping installation, for example the fixing installation, holding installation, at least one molding knife etc., can be provided to this end, said gripping installation gripping the piece 6' of the cable sheath at an advantageous location, whereupon the gripping installation is and/or the cable 1 are/is moved in the axial direction in order for the piece 6' of the cable sheath and the piece 5' of the cable film to be stripped. The advantageous location is preferably situated ideally close to the exposed cable portion. It can be provided for a specific pressure to be exerted on the piece 6' of the cable sheath by means of the gripping installation, so as to ensure that the piece 5' of the cable film is indeed stripped conjointly with the piece 6' of the cable sheath. For this reason, the actuation of the gripping installation toward the cable 1 can be controlled by way of the contact pressure and not by way of a radial position.

Finally, the device 21 illustrated in an exemplary manner moreover has a cable supply installation 25 for the electrical cable 1.

Figure 25:
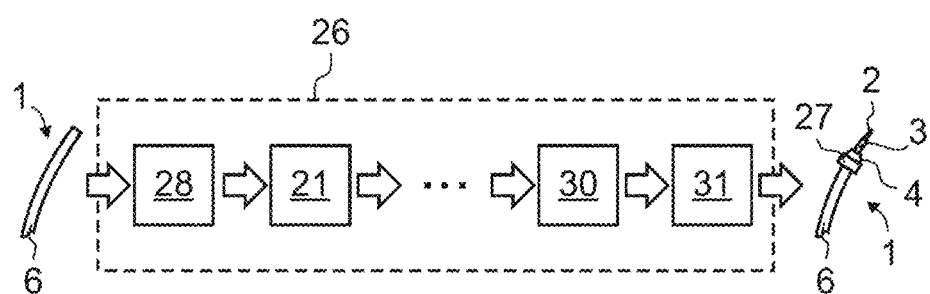
FIG. 25 shows a system for assembling electrical cables.

The invention can advantageously be provided within a system 26 for assembling electrical cables 1. A system 26 for assembling electrical cables 1 is illustrated in FIG. 25. Here, an end portion of the cable 1 is provided with a plug connector part, for example a support sleeve 27, while using a plurality of installations operating in a cycled manner, or a device according to the method according to the invention, respectively. The system 26 can comprise, for example, an installation 28 for cutting to length the cable 1, an installation 30 for opening, erecting and/or inverting a braided cable shield 4, an installation 31 for attaching and contacting a plug connector part, and a device 21 for processing the cable 1 according to the above embodiments, or as described in the exemplary embodiment by means of FIGS. 1 to 23, respectively. Of course, even further devices, or the multiple use of devices or modules within the system 26, can also be provided. The sequence of the processing of the electrical cable 1 can vary depending on the application. The system 26 illustrated is to be understood as merely exemplary.

A fragment of the module MD3 is schematically illustrated in FIG. 3 for visualizing some advantageous refinements of the invention.

It can be provided that the cable film 5 or the piece 5' of the cable film is compressed in that the sheath 6 or the piece 6' of the sheath is held at a first holding position $H_1$, and wherein the cable 1 is held at a first fixing position $F_1$ that in the axial direction is spaced apart from the first holding position $H_1$, whereupon the first holding position $H_1$ and the first fixing position $F_1$ are mutually converged. The portion $a_1$ of the cable film 5, or of the piece 5' of the cable film, respectively, that in the axial direction extends between the first holding position $H_1$ and the first fixing position $F_1$ can thus be compressed so as to facilitate the subsequent removal of the piece 5' of the cable film.

Figure 23:
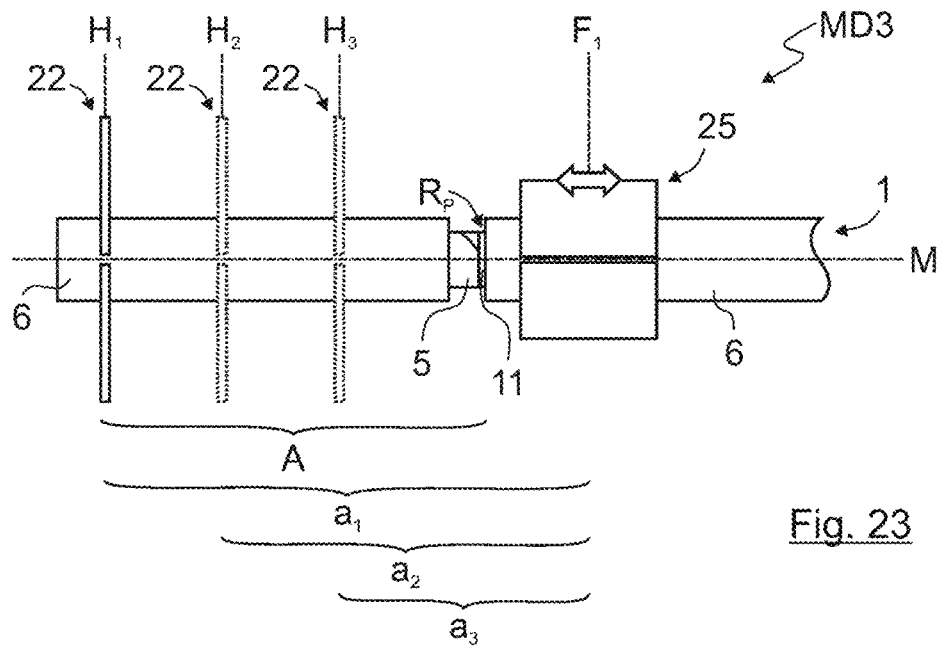
FIG. 23 shows the schematic use of a device for removing in an automated manner a cable film from a cable portion of an electrical cable to be processed, for compressing the cable film according to the invention.

The first fixing position $F_1$ is preferably situated outside the cable portion A to be processed, as is illustrated in FIG. 23. As a result thereof, an existing installation for supplying the cable, for example the cable supply installation 25 of FIG. 22, can in particular be reused for fixing the cable 1 at the first fixing position $F_1$ and for the subsequent relative movement. The first fixing position $F_1$ is preferably actuated toward the first holding position $H_1$.

It can be advantageous for the cable film 5 or the piece 5' of the cable film to be compressed sequentially in a plurality of portions $a_1$, $a_2$, $a_3$ along the cable central axis M. Compressing in portions can be particularly suitable for long cable portions A. An arbitrary number of portions can be provided, in particular as a function of the axial length of the cable portion A. Three portions $a_1$, $a_2$, $a_3$ are indicated in an exemplary manner in FIG. 23.

To this end it can be provided that different holding positions $H_1$, $H_2$, $H_3$ (and/or fixing positions) that in the axial direction are spaced apart along the cable central axes M are used, wherein the portions $a_1$, $a_2$, $a_3$ to be compressed run between holding pairs which are in each case formed from one holding position $H_1$, $H_2$, $H_3$ and one fixing position $F_1$, whereupon for all formed holding pairs the holding position $H_1$, $H_2$, $H_3$ thereof and the fixing position $F_1$ are sequentially mutually converged. It can be particularly advantageous for the first fixing position $F_1$ to be used so as to form corresponding pairs with a plurality of holding positions $H_1$, $H_2$, $H_3$, wherein the fixing position $F_1$ is sequentially actuated toward the respective holding position $H_1$, $H_2$, $H_3$, while the holding positions $H_1$, $H_2$, $H_3$ remain unchanged. This is illustrated in FIG. 23. For example, compressing can first take place in the first portion $a_1$, between the first holding position $H_1$ and the first fixing position $F_1$, subsequently in the second portion $a_2$, between the second holding position $H_2$ and the first fixing position $F_1$, and again subsequently in the third portion $a_3$, between the third holding position $H_3$ and the first fixing position $F_1$. In this way, an arbitrary number of portions (even only one or two portions) can ultimately be compressed in a temporal sequence.

The sheath 6 or the piece 6' of the sheath is preferably held at the at least one holding position $H_1$, $H_2$, $H_3$ and/or at the at least one fixing position $F_1$ by means of the cutting installation 22 and/or by means of the molding tool 13. In order for the sheath 6 to be held at the first fixing position $F_1$, the cable supply installation 25 can also be advantageously used. In principle however, an arbitrary holding installation and/or an arbitrary fixing installation can be provided.

It can be provided that a single holding installation (for example, a single cutting installation 22 or a single molding tool 13) is used for sequentially holding the sheath 6 or the piece 6' of the sheath at the different holding positions $H_1$, $H_2$, $H_3$. To this end, it can be provided, for example, that the holding installation first holds the piece 6' of the sheath at the first holding position $H_1$, whereupon the fixing installation is actuated toward the holding installation, or compressing takes place along the first portion $a_1$, respectively. The holding installation can subsequently be released from the first holding position $H_1$ and actuated toward the second holding position $H_2$ in that the holding installation and/or the cable 1 are/is moved in the axial direction. Compressing can subsequently take place along the second portion $a_2$, followed by the third portion $a_3$, where the procedure is analogous. It can however also be provided that the plurality of holding installations which are in each case assigned to one holding position $H_1$, $H_2$, $H_3$ and are successively actuated for sequentially fixing the sheath 6, or the piece 6' of the sheath, are used. The holding installations can thus be configured so as to be mobile, or an axial displacement of the cable 1 in the course of the sequential compression can be dispensed with.

It can also be provided for the sheath 6 or the piece 6' of the sheath to be simultaneously held at more than one holding position $H_1$, $H_2$, $H_3$, while the sheath 6 or the piece 6' of the sheath, respectively, is compressed according to the invention.

Figure 24:
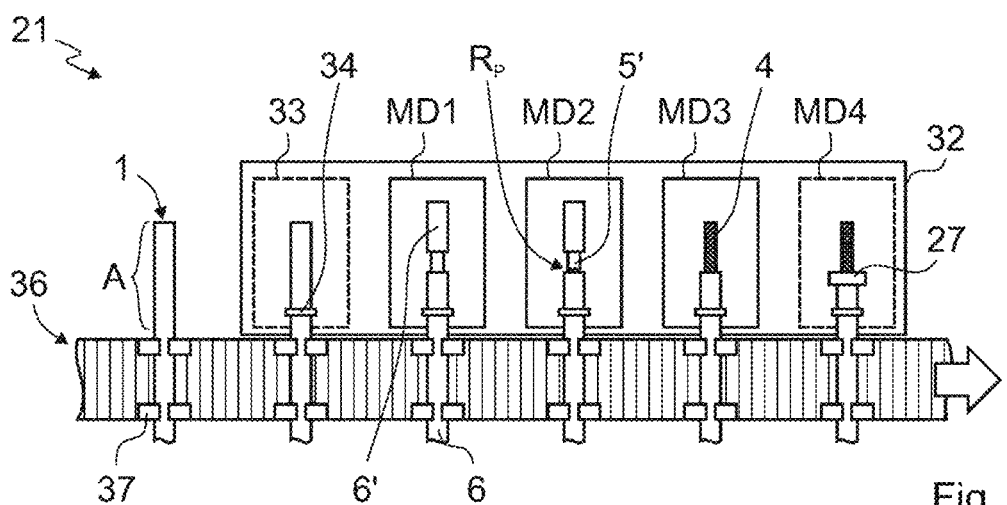
FIG. 24 shows a device for processing an electrical cable, comprising a functional group of mutually independent modules and a transport installation.

FIG. 24 finally shows a device 21 for processing an electrical cable 1 having a sheath 6 and, lying therebelow, a cable film 5, comprising a functional group 32 of mutually dependent modules 33, MD1, MD2, MD3, MD4 for removing a piece 6' of the sheath and a piece 5' of the cable film from the cable 1'.

The functional group 32 has a first module MD1 for severing the piece 6' of the sheath from the cable 1, a second module MD2, downstream of the first module MD1, for reducing the mechanical load-bearing capability of the cable film 5 at an envisaged tearing position $R_P$, and a third module MD3, downstream of the module MD2, for removing in an automated manner the piece 6' of the sheath and the piece 5' of the cable film from the cable 1.

Further modules can optionally also be provided. A mounting module 33, upstream of the first module MD1, for mounting at least one plug connector part, for example the seal ring 34, on the cable 1, is illustrated in the exemplary manner by dashed lines. A fourth module MD4, downstream of the third module MD3, for attaching a support sleeve 27 to the cable 1 is likewise illustrated by dashed lines as a further example.

Provided in the exemplary embodiment is a transport installation 36 for successively actuating a cable portion A, of the cable portion 1, to be processed toward the modules 33, MD1, MD2, MD3, MD4 of the functional group 32. The transport installation 36 can also be dispensed with, depending on the volumes to be produced. The cables 1, or the cable portions A, respectively, in this case can also be transported between the modules 33, MD1, MD2, MD3, MD4 of the functional group 32 by a production operator, for example also while resorting to a roller conveyor. The transport installation 36 is preferably configured in the manner of a workpiece carrier system or of a production line, and transports a plurality of cables 1 from one module to the next module so as to ideally keep all modules 33, MD1, MD2, MD3, MD4 permanently busy and to thus obtain a high throughput in the processing of the cables.

The transport installation 36 can have one or a plurality of gripping installations 37 or workpiece carriers, so as to fix one or a plurality of cables 1 for transporting or for processing by the modules 33, MD1, MD2, MD3, MD4, for example to fix said cables 1 also so as to be secured against rotation. The gripping installations 37, upon approaching module 33, MD1, MD2, MD3, MD4, can moreover be configured for actuating the cable 1, or at least the cable portion A to be processed, to the module 33 MD1, MD2, MD3, MD4 for processing, in particular for introducing said cable 1 into the corresponding module 33, MD1, MD2, MD3, MD4.

The invention also relates to a computer program product having program code means for carrying out a method according to the above embodiments when the program is executed on a control unit of a device 21 for processing an electrical cable 1.

The invention claimed is:

1. A device for processing an electrical cable having a sheath and, lying therebelow, a cable film, the device comprising a group of mutually independent modules for removing a piece of the sheath and a piece of the cable film from the cable,
   wherein the group has a first module for severing the piece of the sheath from the cable, a second module, downstream of the first module, for reducing a mechanical load-bearing capability of the cable film at an envisaged tearing position ($R_P$), and a third module, downstream of the second module, for removing in an automated manner the piece of the sheath and the piece of the cable film from the cable, and
   wherein the third module moreover has a first means for at least one of twisting and bending the cable in a region of the piece of the cable film to be removed.

2. The device as claimed in claim 1,
   wherein the first module, upon severing the piece of the sheath, is configured to partially strip the piece of the sheath from the cable.

3. The device as claimed in claim 1,
   wherein the group, upstream of the first module, further has a mounting module for mounting on the cable an at least one plug connector part.

4. The device as claimed in claim 1,
   wherein the group further has a fourth module, downstream of the third module, for attaching a support sleeve to the cable.

5. The device as claimed in claim 1,
   further including a transport installation for successively feeding a cable portion of the cable to be processed to the modules of the group.

6. The device as claimed in claim 1,
   wherein the second module comprises one of a circular knife, a heating wire, a molding tool, a refrigerated supply installation, a stripping aid, a suctioning installation, or a supply installation for chemicals so as to treat at least one external layer of the cable film that faces away from the cable central axis (M) in order for a mechanical load-bearing capability of said at least one external layer to be reduced.

7. The device as claimed in claim 1,
   wherein the third module has a holding installation for holding the piece of the sheath at a first holding position (H) along a cable central axis (M), wherein the third module further has a fixing installation for holding the sheath of the cable at a first fixing position ($F_1$), and wherein the holding installation and the fixing installation are configured in such a manner that said installations can be mutually converged so as to compress the piece of the cable film.

8. The device as claimed in claim 7,
   wherein the fixing installation is able to be actuated along an actuating direction for the cable toward the holding installation.

9. A system for assembling an electrical cable having a sheath and, lying therebelow, a cable film, the system comprising: a first installation for cutting to length the electrical cable; a second installation for at least one of opening, erecting and inverting a braided cable shield; and a device for processing the electrical cable,
   wherein the device comprises a group of mutually independent modules for removing a piece of the sheath and a piece of the cable film from the cable,
   wherein the group includes a first module for severing the piece of the sheath from the cable, a second module, downstream of the first module, for reducing a mechanical load-bearing capability of the cable film at an envisaged tearing position ($R_P$), and a third module, downstream of the second module, for removing in an automated manner the piece of the sheath and the piece of the cable film from the cable, and
   wherein the third module moreover has a first means for at least one of twisting and bending the cable in a region of the piece of the cable film to be removed.

10. A method for processing an electrical cable having a sheath and, lying therebelow, a cable film, in which method a group of mutually independent modules is used for removing a piece of the sheath and a piece of the cable film from the cable, the method comprising the steps of:

using a first module of the group to sever the piece of the sheath from the cable, whereupon using a second module of the group to reduce a mechanical load-bearing capability of the cable film at an envisaged tearing position ($R_P$); and whereupon using a third module of the group to remove in an automated manner the piece of the sheath and the piece of the cable film from the cable, wherein the third module moreover has a first means for at least one of twisting and bending the cable in a region of the piece of the cable film to be removed.

11. The method as claimed in claim 10, wherein the second module performs at least one of:

subject an at least one external layer of the cable film that faces away from a cable central axis (M), at least in the region of the envisaged tearing position ($R_P$), to an at least one of a thermal treatment, a chemical treatment, an abrasive treatment and a suctioning procedure, score the cable film, and adhesively bond a stripping aid to the cable film and then strip said stripping aid from the cable film.

12. The method as claimed in claim 10, wherein the second module at the envisaged tearing position ($R_P$) incorporates in the cable film an at least partially ring-shaped encircling tear in such a manner that the tear extends through the external layer and also at least partially through an internal layer of the cable film that is situated below the external layer.

13. The method as claimed in claim 10, wherein an at least one of a heated molding tool and a heating wire is used for thermal treatment of the cable film.

14. The method as claimed in claim 10, wherein the third module removes the piece of the cable film from the cable in that the piece of the cable film is at least one of brushed off, blown off, unwound, wiped off, and stripped conjointly with the piece of the sheath.

15. The method as claimed in claim 10, wherein the third module compresses the piece of the cable film in an axial direction along a cable central axis (M) before the piece of the cable film is removed from the cable.

16. The method as claimed in claim 15, wherein the third module indirectly compresses the piece of the cable film in that the piece of the sheath that sheathes the piece of the cable film is compressed.

17. The method as claimed in claim 16, wherein the third module indirectly compresses the piece of the cable film in that the piece of the sheath is held at a first holding position ($H_1$), wherein the sheath of the cable is held at a first fixing position ($F_1$) that in the axial direction is spaced apart from the first holding position ($H_1$), whereupon the first holding position ($H_1$) and the first fixing position ($F_1$) are mutually converged.

18. The method as claimed in claim 17, wherein the first holding position (H1) and the first fixing position (F1) are mutually converged in that the first fixing position (F1) is actuated toward the first holding position ($H_1$).

* * * * *